(12) United States Patent
Tian et al.

(10) Patent No.: US 11,617,181 B2
(45) Date of Patent: Mar. 28, 2023

(54) MULTI-STAGE DOWNLINK GRANT FOR MULTIPLE PDSCH

(71) Applicant: QUALCOMM Incorporated, San Diego, CA (US)

(72) Inventors: Qingjiang Tian, San Diego, CA (US); Xiaoxia Zhang, San Diego, CA (US); Jing Sun, San Diego, CA (US); Zhifei Fan, San Diego, CA (US); Wooseok Nam, San Diego, CA (US); Ahmed Abdelaziz Ibrahim Abdelaziz Zewail, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/170,810

(22) Filed: Feb. 8, 2021

(65) Prior Publication Data
US 2022/0256543 A1    Aug. 11, 2022

(51) Int. Cl.
*H04W 72/04* (2009.01)
*H04L 1/1812* (2023.01)
(Continued)

(52) U.S. Cl.
CPC ....... *H04W 72/0493* (2013.01); *H04L 1/1819* (2013.01); *H04W 72/042* (2013.01);
(Continued)

(58) Field of Classification Search
CPC ........... H04W 72/0493; H04W 72/042; H04W 72/0446; H04W 72/0453; H04W 72/14; H04L 1/1819
See application file for complete search history.

(56) References Cited

U.S. PATENT DOCUMENTS

| | | | |
|---|---|---|---|
| 2018/0234998 A1* | 8/2018 | You ................... | H04W 72/1289 |
| 2019/0149365 A1* | 5/2019 | Chatterjee ............. | H04L 5/0044 |
| | | | 370/329 |

(Continued)

FOREIGN PATENT DOCUMENTS

| EP | 3751776 A1 | 12/2020 |
|---|---|---|
| WO | 2021/154943 A1 | 8/2021 |

OTHER PUBLICATIONS

International Search Report and Written Opinion dated May 17, 2022 from corresponding PCT Application No. PCT/US2022/070458.

(Continued)

*Primary Examiner* — Jael M Ulysse
(74) *Attorney, Agent, or Firm* — Arun Swain; ArentFox Schiff LLP

(57) ABSTRACT

Aspects of a multi-stage multi-PDSCH grant are provided which allow a UE to obtain data in a downlink data burst with more scheduling flexibility than single-stage multi-PDSCH grants. A base station provides the UE in a downlink control channel a first portion of downlink control information which indicates a plurality of downlink data transmissions. The UE monitors the downlink control channel for the first portion of downlink control information. Afterwards, the base station sends to the UE a second portion of the downlink control information including parameters for one of the downlink data transmissions. The base station may also send the UE a third portion of the downlink control information including additional parameters for the downlink data transmission. After the UE obtains the portions, the UE decodes the one of the downlink data transmissions indicated at least in part by the first and second portion of the downlink control information.

28 Claims, 15 Drawing Sheets

(51) Int. Cl.
*H04W 72/0446* (2023.01)
*H04W 72/0453* (2023.01)
*H04W 72/14* (2009.01)

(52) U.S. Cl.
CPC ... *H04W 72/0446* (2013.01); *H04W 72/0453* (2013.01); *H04W 72/14* (2013.01)

(56) References Cited

U.S. PATENT DOCUMENTS

| | | | | |
|---|---|---|---|---|
| 2019/0150123 | A1* | 5/2019 | Nogami | H04L 5/0053 370/330 |
| 2019/0150124 | A1* | 5/2019 | Nogami | H04L 5/0094 370/330 |
| 2019/0158205 | A1* | 5/2019 | Sheng | H04B 7/0626 |
| 2019/0281588 | A1* | 9/2019 | Zhang | H04L 5/0051 |
| 2019/0306841 | A1* | 10/2019 | Huang | H04W 76/34 |
| 2019/0342907 | A1* | 11/2019 | Huang | H04L 5/0048 |
| 2020/0022144 | A1* | 1/2020 | Papasakellariou | H04W 72/0413 |
| 2020/0107347 | A1* | 4/2020 | Basu Mallick | H04W 48/12 |
| 2020/0213981 | A1* | 7/2020 | Park | H04L 1/1864 |
| 2020/0328849 | A1* | 10/2020 | Noh | H04W 72/042 |
| 2020/0358487 | A1* | 11/2020 | Yang | H04L 1/1819 |
| 2020/0374045 | A1* | 11/2020 | Yin | H04B 7/0456 |
| 2020/0374967 | A1* | 11/2020 | Nogami | H04L 5/1469 |
| 2020/0396760 | A1* | 12/2020 | Yi | H04L 1/1864 |
| 2021/0006376 | A1* | 1/2021 | Cirik | H04L 5/0094 |
| 2021/0007066 | A1* | 1/2021 | Lin | H04L 5/005 |
| 2021/0160879 | A1* | 5/2021 | Lin | H04W 72/14 |
| 2021/0234640 | A1* | 7/2021 | Cirik | H04L 1/1896 |
| 2021/0266941 | A1* | 8/2021 | Park | H04L 27/2607 |
| 2021/0360666 | A1* | 11/2021 | Yoshimura | H04W 72/1273 |
| 2022/0029746 | A1* | 1/2022 | Noh | H04B 7/024 |
| 2022/0052824 | A1* | 2/2022 | Kim | H04L 1/1896 |
| 2022/0116952 | A1* | 4/2022 | Lee | H04L 5/0053 |
| 2022/0173867 | A1* | 6/2022 | Nogami | H04L 5/001 |
| 2022/0201724 | A1* | 6/2022 | Zhang | H04L 1/1896 |

OTHER PUBLICATIONS

Zte et al.: "PDCCH procedure and DCI carried by POSCH region", 3GPP Draft; R1-1701588, 3rd Generation Partnership Project (3GPP), Mobile Competence Centre; 650, Route Des Lucioies; F-06921 Sophia-Antipolis Cedex ; France Feb. 7, 2017 (Feb. 7, 2017), pp. 1-4, XP051220807, Retrieved from the Internet: URL:http://www.3gpp.org/ftp/tsg_ran/WG1_RL1/TSGR1_88/Docs/.

* cited by examiner

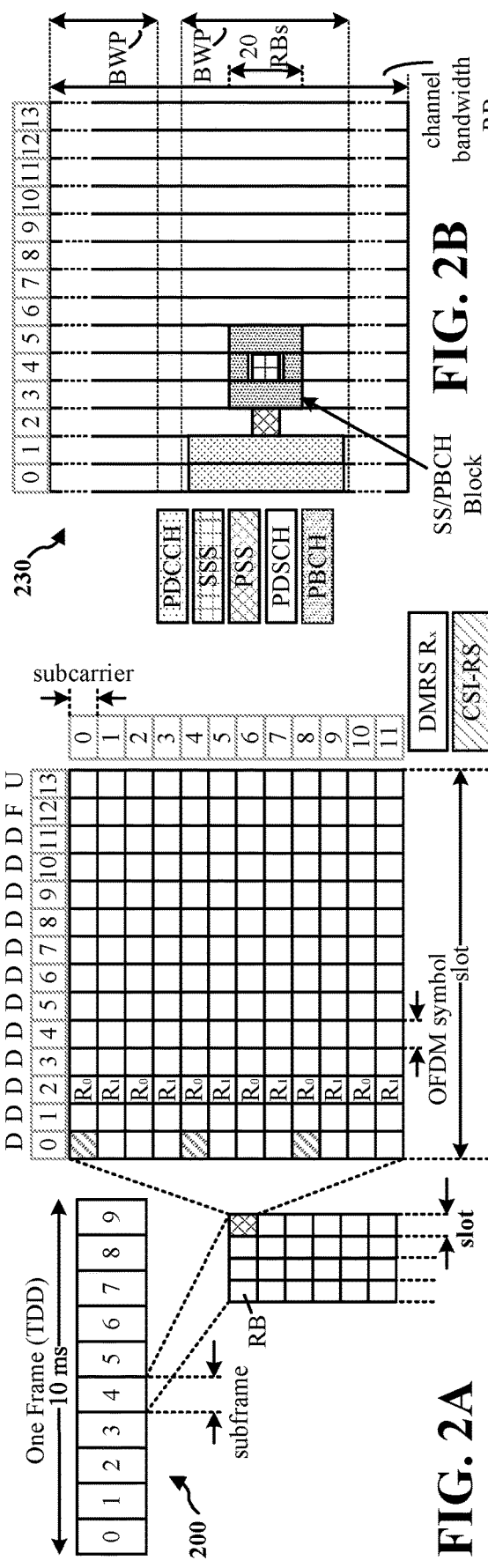
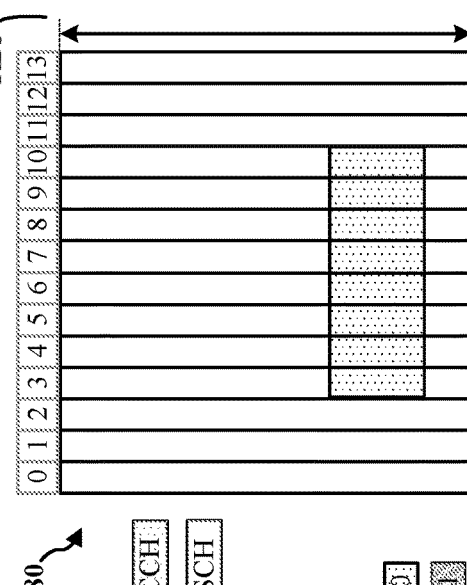
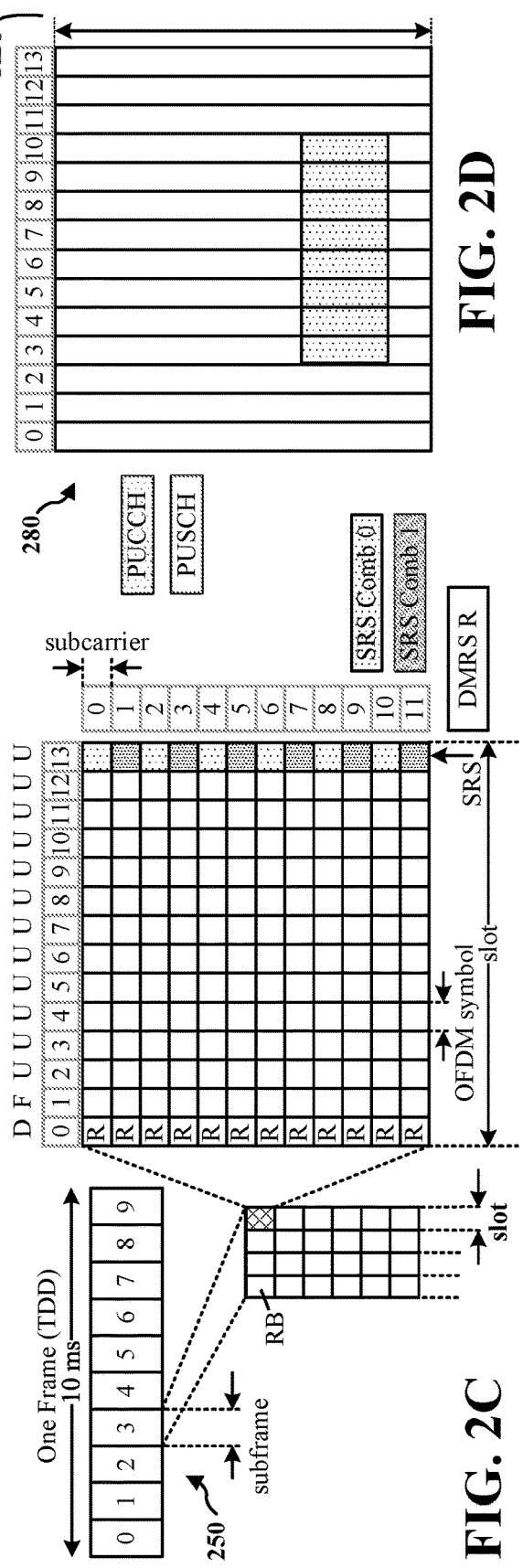
FIG. 2A
FIG. 2B
FIG. 2C
FIG. 2D

MULTI-STAGE DOWNLINK GRANT FOR MULTIPLE PDSCH

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE monitors a downlink control channel for a first portion of downlink control information, where the first portion of downlink control information indicates a plurality of downlink data transmissions. The UE obtains a second portion of the downlink control information including parameters for one of the downlink data transmissions. The UE decodes the one of the downlink data transmissions indicated at least in part by the first portion of the downlink control information and the second portion of the downlink control information.

In an aspect of the disclosure, a method, a computer-readable medium, and an apparatus are provided. The apparatus may be a base station. The base station provides a first portion of downlink control information in a downlink control channel, where the first portion of downlink control information indicates a plurality of downlink data transmissions. The base station sends a second portion of the downlink control information including parameters for one of the downlink data transmissions, where the one of the downlink data transmissions is indicated at least in part by the first portion of the downlink control information and the second portion of the downlink control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
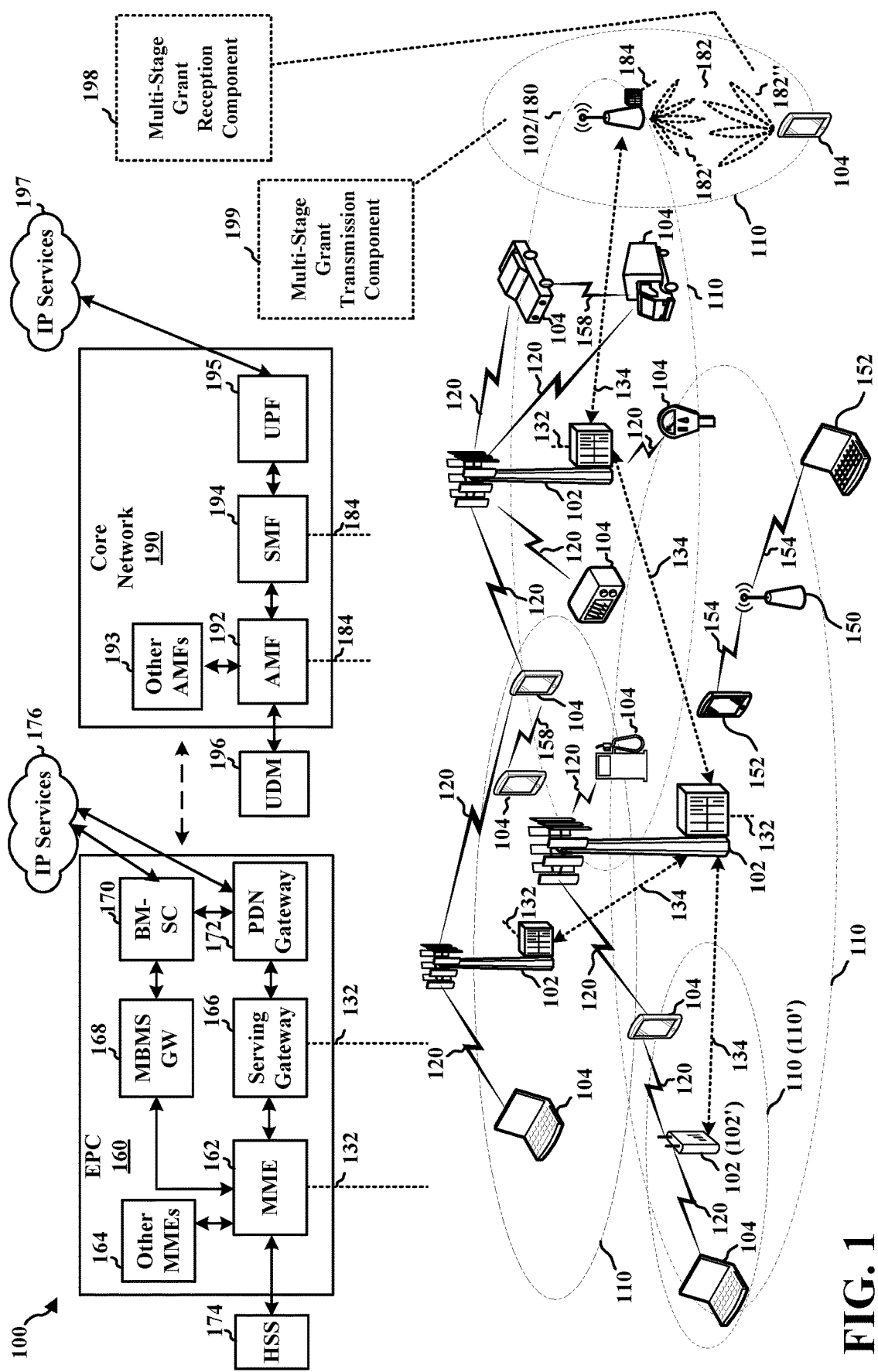
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a base station provides an uplink grant to a UE scheduling data in a physical uplink shared channel (PUSCH), the base station may provide either: a single grant that schedules one PUSCH transmission from the UE (referred to here as a single-PUSCH grant), or a single grant that schedules multiple, continuous PUSCH transmissions from the UE (referred to here as a multi-PUSCH grant). The multi-PUSCH grant may provide savings in uplink control overhead compared to single-PUSCH grants. For example, the multi-PUSCH grant may be in the form of downlink control information (DCI) that indicates common parameters for the PUSCH transmissions. These parameters may include a same frequency domain resource assignment (FDRA), a same modulation and coding scheme (MCS), and a same rank for each PUSCH transmission. The DCI may also include a time domain resource assignment (TDRA) that indicates starting and ending times for each PUSCH transmission. For instance, the TDRA may indicate multiple Start and Length Indicator (SLIV) values, where each SLIV value defines the starting symbol and time duration of each PUSCH transmission. Moreover, the DCI may indicate a hybrid automatic repeat request (HARQ) process number corresponding to the initially scheduled PUSCH transmission. The HARQ process number may increase incrementally for each subsequently scheduled PUSCH transmission. For instance, if a DCI scheduling three uplink data transmissions indicates HARQ process ID 0, the UE and base station may determine that the first PUSCH transmission corresponds to HARQ process ID 0, the second PUSCH transmission corresponds to HARQ process ID 1, and the third PUSCH transmission corresponds to HARQ process ID 2. Furthermore, the DCI may indicate a separate, new data indicator (NDI) and a separate, compressed redundancy version identifier (RVID) for each PUSCH transmission. As a result of these design considerations for multi-PUSCH grants (e.g., common FDRA, MCS and rank, multiple SLIVs in a TDRA, incremental HARQ process numbers, separate NDIs, and compressed RVIDs), a balance between PUSCH scheduling flexibility and reduced control overhead (DCI length) may be achieved.

Likewise, a base station may provide a downlink grant to a UE scheduling data in a physical downlink shared channel (PDSCH) in either: a single grant that schedules one PDSCH transmission to the UE (referred to here as a single-PDSCH grant), or a single grant that schedules multiple, continuous PDSCH transmissions to the UE (referred to here as a single-stage multi-PDSCH grant). The single-stage multi-PDSCH grant may similarly provide downlink control overhead savings over single-PDSCH grants. For example, the single-stage multi-PDSCH grant may include common FDRA, MCS and rank, multiple SLIVs in a TDRA, incremental HARQ process numbers, separate NDIs, and compressed RVIDs in similar fashion to multi-PUSCH grants. Additionally, a single-stage multi-PDSCH grant may schedule longer data bursts than multiple, single-PDSCH grants due to the lack of intervening grants between scheduled PDSCH transmissions. Such timing efficiency may be particularly beneficial in millimeter wave (mmW) environments, where the subcarrier spacing (SCS) may be relatively large (e.g., 240 kHz SCS) and the slot time duration may be relatively short (e.g., 0.0625 ms).

Nevertheless, while single-stage multi-PDSCH grants may reduce control overhead (e.g., DCI size) compared to single-PDSCH grants, such multi-PDSCH grants may still lack a degree of scheduling flexibility. For example, in similar fashion to multi-PUSCH grants, single-stage multi-PDSCH grants indicate a single HARQ process ID for an initially scheduled PDSCH transmission, and the HARQ process number increases incrementally for each subsequently scheduled PDSCH transmission. Accordingly, to accommodate incremental HARQ processes while attempting to save control overhead, the HARQ information field in the single-stage multi-PDSCH grant may be constrained to a maximum number of bits (e.g., 4 bits). However, since each PDSCH transmission is associated with a different incremental HARQ process ID, this constraint not only limits the HARQ process IDs that may be used (e.g., a maximum of sixteen HARQ process IDs for four bits), but also limits the number of PDSCH transmissions the multi-PDSCH grant may schedule (e.g., a maximum of sixteen downlink data transmissions for sixteen HARQ process IDs). In another example, similar to multi-PUSCH grants, the RVID for each scheduled PDSCH transmission may be compressed from two bits to a single bit to save downlink control overhead. However, this compression may limit the amount of redundancy added to the data during encoding, thus causing a small loss of coding gain for each PDSCH transmission.

Furthermore, in single-stage multi-PDSCH grants, the base station is constrained to make its scheduling decisions (e.g., what data to transmit and when) prior to transmitting the downlink grant scheduling the downlink data burst. As a result, even if the base station receives HARQ feedback from the UE during the downlink data burst, the base station may not change its scheduling decisions until a subsequent multi-PDSCH grant. For instance, assume in one example that the base station provides a single-stage multi-PDSCH grant scheduling eight PDSCH transmissions, and that the UE fails to successfully decode one of the PDSCH transmissions. In such case, even if the base station receives a NACK from the UE prior to the eighth PDSCH transmission, the base station may not retroactively change its prior grant and reschedule the retransmission for the failed one of the PDSCH transmissions. Instead, the UE waits until the base station completes all eight PDSCH transmissions before the base station issues a subsequent grant scheduling the retransmission. Such inflexibility may waste time and resources.

Accordingly, it would be helpful to provide a downlink grant which schedules multiple PDSCH transmissions with more flexibility than single-stage multi-PDSCH grants. To this end, aspects of the present disclosure provide a multi-stage multi-PDSCH grant which provides more flexibility in scheduling multiple PDSCH transmissions than single-stage multi-PDSCH grants. In the multi-stage downlink grant, the base station may split DCI into multiple stages or parts or portions (e.g., a first part of DCI and a second part of DCI), which the base station may configure and send at different times. For example, the base station may provide a first part of DCI to a UE in PDCCH in advance of multiple scheduled PDSCH transmissions, and the base station may provide a second part of DCI to the UE at latest in a slot of each scheduled PDSCH transmission. The base station may also provide a third part of DCI to the UE in a slot of each scheduled PDSCH transmission. By splitting DCI in such manner, the base station may dynamically change the DCI parameters of subsequently scheduled PDSCH transmission(s), for example, in response to HARQ feedback from a UE, without requiring the UE to wait until a following multi-PDSCH grant is issued down the line. Moreover, since the base station may change certain DCI parameters such as HARQ process IDs and RVIDs at latest during the same slot of a scheduled PDSCH transmission, the maximum number of bits for HARQ process numbers may no longer be a significant constraint in DCI, and compression of RVIDs may be avoided.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a multi-stage grant reception component 198 that is configured to monitor a downlink control channel for a first portion of downlink control information, where the first portion of downlink control information indicates a plurality of downlink data transmissions; obtain a second portion of the downlink control information including parameters for one of the downlink data transmissions; and decode the one of the downlink data transmissions indicated at least in part by the first portion of the downlink control information and the second portion of the downlink control information.

Still referring to FIG. 1, in certain aspects, the base station 180 may include a multi-stage grant transmission component 199 that is configured to provide a first portion of downlink control information in a downlink control channel, where the first portion of downlink control information indicates a plurality of downlink data transmissions; and send a second portion of the downlink control information including parameters for one of the downlink data transmissions; where the one of the downlink data transmissions is indicated at least in part by the first portion of the downlink control information and the second portion of the downlink control information.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). FIG. 2B illustrates an example of various DL channels within a subframe of a frame.

The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
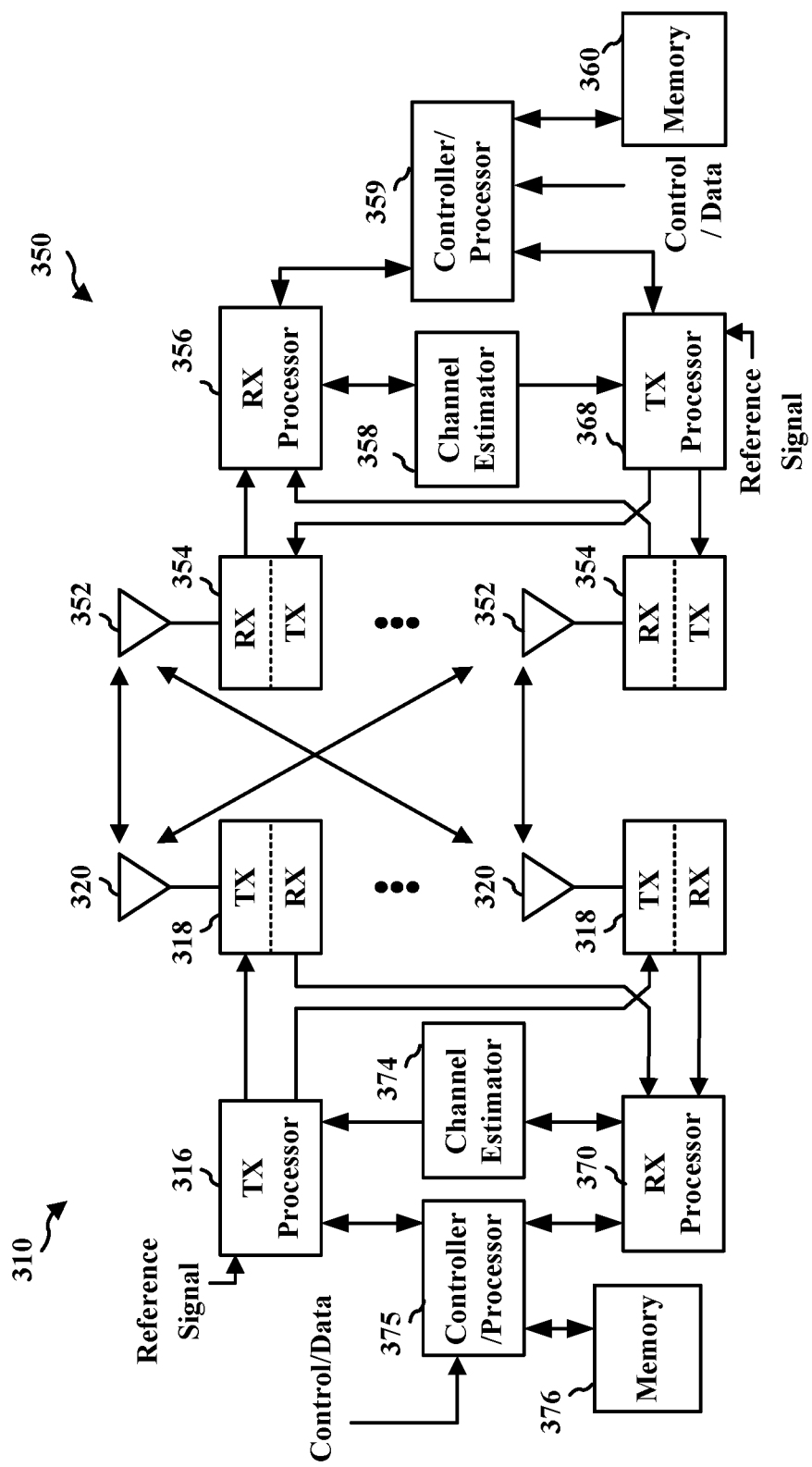
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with multi-stage grant reception component 198 of FIG. 1.

At least one of the TX processor 316, the RX processor 370, and the controller/processor 375 may be configured to perform aspects in connection with multi-stage grant transmission component 199 of FIG. 1.

When a base station provides an uplink grant to a UE scheduling data in a PUSCH, the base station may provide either: a single grant that schedules one PUSCH transmission from the UE (referred to here as a single-PUSCH grant), or a single grant that schedules multiple, continuous PUSCH transmissions from the UE (referred to here as a multi-PUSCH grant). The multi-PUSCH grant may provide savings in uplink control overhead compared to single-PUSCH grants. For example, the multi-PUSCH grant may be in the form of DCI that indicates common parameters for the PUSCH transmissions. These parameters may include a same FDRA, a same MCS, and a same rank for each PUSCH transmission. The DCI may also include a TDRA that indicates starting and ending times for each PUSCH transmission. For instance, the TDRA may indicate multiple SLIV values, where each SLIV value defines the starting symbol and time duration of each PUSCH transmission. Moreover, the DCI may indicate a HARQ process number corresponding to the initially scheduled PUSCH transmission. The HARQ process number may increase incrementally for each subsequently scheduled PUSCH transmission. For instance, if a DCI scheduling three uplink data transmissions indicates HARQ process ID 0, the UE and base station may determine that the first PUSCH transmission corresponds to HARQ process ID 0, the second PUSCH transmission corresponds to HARQ process ID 1, and the third PUSCH transmission corresponds to HARQ process ID 2. Furthermore, the DCI may indicate a separate, NDI and a separate, compressed RVID for each PUSCH transmission. As a result of these design considerations for multi-PUSCH grants (e.g., common FDRA, MCS and rank, multiple SLIVs in a TDRA, incremental HARQ process numbers, separate NDIs, and compressed RVIDs), a balance between PUSCH scheduling flexibility and reduced control overhead (DCI length) may be achieved.

Likewise, a base station may provide a downlink grant to a UE scheduling data in a PDSCH in either: a single grant that schedules one PDSCH transmission to the UE (referred to here as a single-PDSCH grant), or a single grant that schedules multiple, continuous PDSCH transmissions to the UE (referred to here as a single-stage multi-PDSCH grant). The single-stage multi-PDSCH grant may provide downlink control overhead savings over single-PDSCH grants. For example, the single-stage multi-PDSCH grant may include common FDRA, MCS and rank, multiple SLIVs in a TDRA, incremental HARQ process numbers, separate NDIs, and compressed RVIDs in similar fashion to multi-PUSCH grants. Additionally, a single-stage multi-PDSCH grant may schedule longer data bursts than multiple, single-PDSCH grants due to the lack of intervening grants between scheduled PDSCH transmissions. Such timing efficiency may be particularly beneficial in mmW environments, where the SCS may be relatively large (e.g., 240 kHz SCS) and the slot time duration may be relatively short (e.g., 0.0625 ms).

Figure 4:
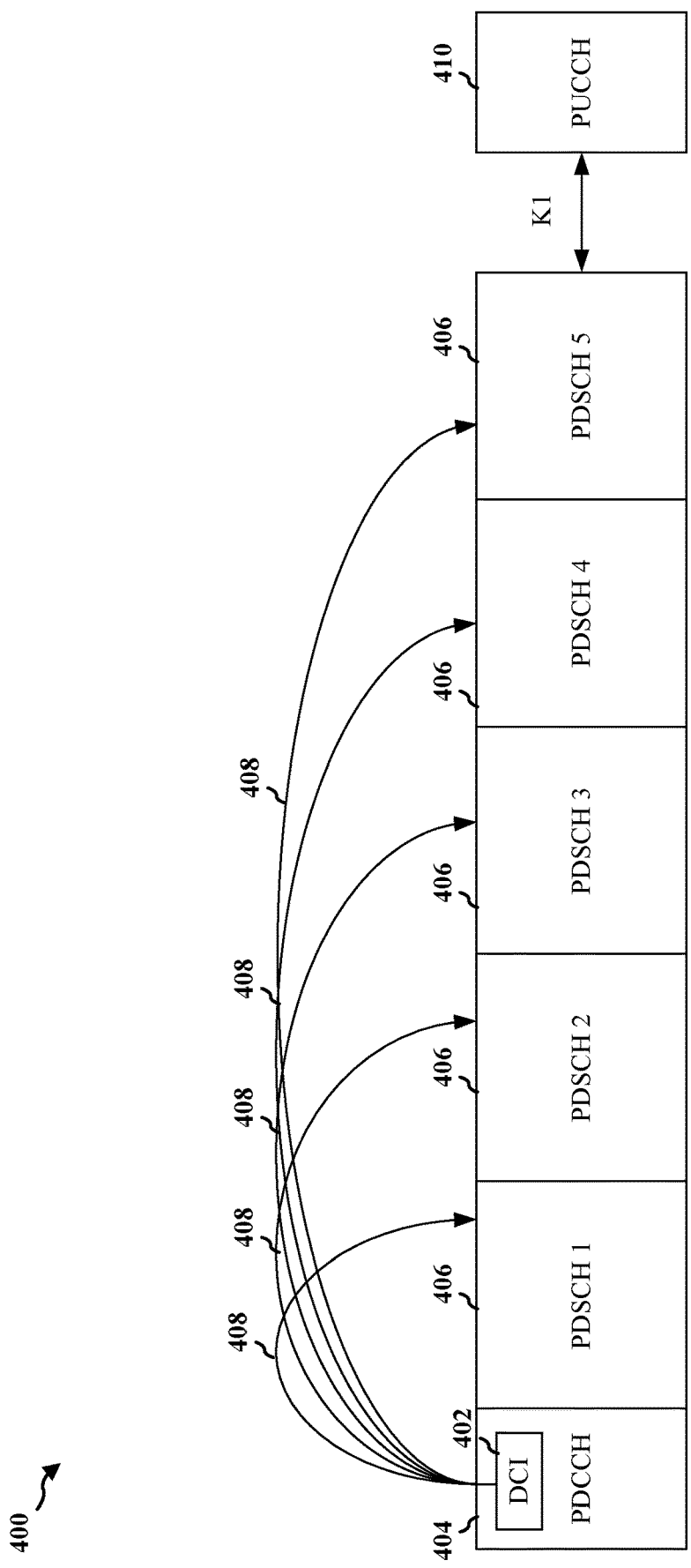
FIG. 4 is a diagram illustrating an example of a single-stage downlink grant scheduling a plurality of data transmissions.

FIG. 4 illustrates an example 400 of a single-stage multi-PDSCH grant. In this example, the base station provides a DCI 402 to the UE in a physical downlink control channel (PDCCH) 404 which schedules a plurality of PDSCH transmissions 406. For example, each PDSCH transmission 406 may include downlink data occupying a respective slot. While in the illustrated example the single-stage multi- PDSCH grant schedules five different transport blocks (e.g., PDSCH 1-5), in other examples a different number of PDSCH transmissions may be scheduled. The DCI 402 may include scheduling information 408 (e.g., FDRA, TDRA, MCS, rank, NDIs, RVIDs, etc.) for each of the PDSCH transmissions 406. After receiving one or more of the PDSCH transmissions 406, the UE may provide HARQ acknowledgment/negative-acknowledgment (HARQ-ACK/NACK) in a physical uplink control channel (PUCCH) 410. The UE may transmit the HARQ-ACK/NACK in PUCCH 410 a number of slots K1 following reception of the last corresponding PDSCH transmission.

Nevertheless, while single-stage multi-PDSCH grants may reduce control overhead (e.g., DCI size) compared to single-PDSCH grants, such multi-PDSCH grants may still lack a degree of scheduling flexibility. For example, in similar fashion to multi-PUSCH grants, single-stage multi-PDSCH grants indicate a single HARQ process ID for an initially scheduled PDSCH transmission, and the HARQ process number increases incrementally for each subsequently scheduled PDSCH transmission. Accordingly, to accommodate incremental HARQ processes while attempting to save control overhead, the HARQ information field in the single-stage multi-PDSCH grant may be constrained to a maximum number of bits (e.g., 4 bits). However, since each PDSCH transmission is associated with a different incremental HARQ process ID, this constraint not only limits the HARQ process IDs that may be used (e.g., a maximum of sixteen HARQ process IDs for four bits), but also limits the number of PDSCH transmissions the multi-PDSCH grant may schedule (e.g., a maximum of sixteen downlink data transmissions for sixteen HARQ process IDs). In another example, similar to multi-PUSCH grants, the RVID for each scheduled PDSCH transmission may be compressed from two bits to a single bit to save downlink control overhead. However, this compression may limit the amount of redundancy added to the data during encoding, thus causing a loss of coding gain for each PDSCH transmission.

Furthermore, in single-stage multi-PDSCH grants, the base station is constrained to make its scheduling decisions (e.g., what data to transmit and when) prior to transmitting the downlink grant scheduling the downlink data burst. As a result, even if the base station receives HARQ feedback from the UE during the downlink data burst, the base station may not change its scheduling decisions until a subsequent multi-PDSCH grant. For instance, assume in one example that the base station provides a single-stage multi-PDSCH grant scheduling eight PDSCH transmissions, and that the UE fails to successfully decode one of the PDSCH transmissions. In such case, even if the base station receives a NACK from the UE prior to the eighth PDSCH transmission, the base station may not retroactively change its prior grant and reschedule the retransmission for the failed one of the PDSCH transmissions. Instead, the UE waits at least until the base station completes all eight PDSCH transmissions before the base station issues a subsequent grant scheduling the retransmission. Such inflexibility may waste time and resources.

Accordingly, it would be helpful to provide a downlink grant which schedules multiple PDSCH transmissions with more flexibility than single-stage multi-PDSCH grants. To this end, aspects of the present disclosure provide a multi-stage multi-PDSCH grant which provides more flexibility in scheduling multiple PDSCH transmissions than single-stage multi-PDSCH grants. In the multi-stage downlink grant, the base station may split DCI into multiple stages or parts (e.g., a first part of DCI and a second part of DCI), which the base station may configure and send at different times. For example, the base station may provide a first part of DCI to a UE in PDCCH in advance of multiple scheduled PDSCH transmissions, and the base station may provide a second part of DCI to the UE at latest in a slot prior to the slot of each scheduled PDSCH transmission. The base station may also provide a third part of DCI to the UE in a slot of each scheduled PDSCH transmission. By splitting DCI in such manner, the base station may dynamically change the DCI parameters of subsequently scheduled PDSCH transmission(s), for example, in response to HARQ feedback from a UE, without requiring the UE to wait until a following multi-PDSCH grant is issued down the line. Moreover, since the base station may change certain DCI parameters such as HARQ process IDs and RVIDs at latest during each slot of a scheduled PDSCH transmission, the maximum number of bits for HARQ process numbers may no longer be a significant constraint in DCI, and compression of RVIDs may be avoided.

The first part of DCI in PDCCH may include time critical information for PDSCH transmissions. Here, "time critical" information refers to scheduling information which the UE receives prior to a PDSCH transmission in order to successfully decode the PDSCH transmission. For example, the time critical information may include a bandwidth part (BWP) indicator, a FDRA, a virtual resource block (VRB) to physical resource block (PRB) mapping, a TDRA including a DMRS pattern, a transmission configuration indicator (TCI) (for analog beamforming in mmW bands), a rate matching indicator, one or more antenna ports, a PRB bundling size, a MCS, or a rank of the transmission. The time critical information may also include a carrier indicator for the PDSCH transmissions, even though this parameter may not change between scheduled PDSCH transmissions. When the base station configures time critical information for a scheduled PDSCH transmission, the base station may transmit this information in PDCCH as the first part of DCI, or in a PDSCH transmission prior to the scheduled PDSCH transmission as the second part of DCI.

The first part of DCI may include the total number of scheduled PDSCH transmissions in the multi-stage, multi-PDSCH grant. In some cases, the PDCCH including the first part of DCI may include all of the scheduling information (time-critical and not time-critical) for an initially scheduled PDSCH transmission. Additionally or alternatively, the first part of DCI may include scheduling information for some (or all) of the subsequently scheduled PDSCH transmissions. For instance, the first part of DCI may be configured to be the same for multiple, scheduled PDSCH transport blocks (e.g., each scheduled PDSCH transmission in the multi-stage, multi-PDSCH grant has the same FDRA, rank, MCS, DMRS pattern, etc.), as this scheduling information may not change between PDSCH transmissions. In some cases, the length (in bits) of the first part of DCI may be similar in length to that of DCI in a single-PDSCH grant. For instance, the first part of DCI may add fields in comparison to DCI in single-PDSCH grants (e.g., a total number of scheduled PDSCH transmissions), and remove fields in comparison to DCI in single-PDSCH grants (e.g., HARQ process number, NDI, RVID, etc.).

The second part of DCI may include incremental information for PDSCH transmissions. Here, "incremental" information refers to scheduling information which the UE may receive at latest together with a PDSCH transmission in order to successfully decode the PDSCH transmission. For example, the incremental information may include a NDI, a RV, a HARQ process number, a downlink assignment index (DAI), a zero power (ZP) channel state information (CSI) (ZP-CSI) trigger, a transmission power control (TPC) command, a PDSCH-to-HARQ feedback timing indicator (K1), a PUCCH resource indicator (PM) corresponding to the HARQ feedback timing indicator, a sounding reference signal (SRS) request, a codeblock group transmission information (CBGTI), a codeblock group flushing out information (CBGFI), or a TCI (for digital beamforming in sub-6 GHz bands [non-mmW]) for the transmission. When the base station configures incremental information for a scheduled PDSCH transmission, the base station may transmit this information in PDCCH, in a PDSCH transmission prior to the scheduled PDSCH transmission as the second part of DCI, or in the scheduled PDSCH transmission itself as the second part of DCI.

In some cases, the DCI may be split into three parts, and the incremental information may be apportioned between the second part of DCI and the third part of DCI. For example, in cases where the incremental information is sent in a PDSCH transmission prior to the scheduled PDSCH transmission (as the second part of DCI), the base station may also provide other incremental information in the scheduled PDSCH transmission itself as a third part of DCI. Accordingly, when the base station configures a multi-stage, multi-PDSCH grant, in some examples the base station may provide time-critical information as the first part of DCI in PDCCH, a portion of the incremental information in a prior scheduled PDSCH transmission as the second part of DCI, and a remaining portion of the incremental information in a current scheduled PDSCH transmission as the third part of DCI.

Thus, the second part (and third part) of DCI may offer more scheduling flexibility to a base station than single-stage multi-PDSCH grants. For instance, the second part or third part of DCI may be separately configured for multiple, scheduled PDSCH transport blocks (e.g., each scheduled PDSCH transmission in the multi-stage, multi-PDSCH grant may have different PM, HARQ feedback timing indicator, etc.), as this scheduling information may change between PDSCH transmissions. Furthermore, the second part or third part of DCI may include non-time critical information for a corresponding PDSCH transmission (e.g., HARQ process ID, NDI, RVID), unless such non-time critical information is also included in the first part of DCI (i.e., the first part of DCI may in some cases include non-time critical information as well as time critical information as described above). Moreover, the second part or third part of DCI may include HARQ feedback information, such as PRI or PDSCH-to-HARQ feedback timing indicator. Furthermore, the second part of DCI may include scheduling information for a subsequent PDSCH transmission, such as TDRA. Thus, when the base station configures a multi-stage multi-PDSCH grant, the base station may effectively form a scheduling chain by piggybacking or multiplexing a second part of DCI in each scheduled PDSCH transmission, as each second part of DCI may provide scheduling information for a current PDSCH transmission and a subsequent PDSCH transmission, if present.

The base station may apportion scheduling information in a multi-stage downlink grant into multiple parts of DCI according to various options. In a first option, described below with respect to FIGS. 5 and 6A-6B, the base station may configure a first part of DCI in PDCCH to include minimum (e.g., time-critical) common scheduling information for all scheduled PDSCH transmissions, and a second part of DCI to include incremental scheduling information for currently scheduled PDSCH transmissions. That is, in this option, the second part of DCI is multiplexed in the same resources as the PDSCH transmission being scheduled. In a second option, described below with respect to FIGS. 7 and 8A-8B, the base station may configure a first part of DCI in PDCCH to include minimum common scheduling information for all scheduled PDSCH transmissions, and a second part of DCI to include incremental scheduling information for subsequently scheduled PDSCH transmissions. That is, in this option, the second part of DCI is multiplexed with a PDSCH transmission in a prior slot to the PDSCH transmission being scheduled. Additionally, the second part of DCI for the initially scheduled PDSCH transmission may be multiplexed in PDCCH with the first part of DCI. In a third option, described below with respect to FIGS. 9 and 10A-10C, the base station may configure a first part of DCI in PDCCH to include minimum common scheduling information for all scheduled PDSCH transmissions, a second part of DCI to include incremental scheduling information for subsequently scheduled PDSCH transmissions, and a third part of DCI to include incremental scheduling information for currently scheduled PDSCH transmissions. That is, in this option, the second part of DCI is multiplexed with a PDSCH transmission in a prior slot to the PDSCH transmission being scheduled, and the third part of DCI is multiplexed in the same resources as the PDSCH transmission being scheduled.

Figure 5:
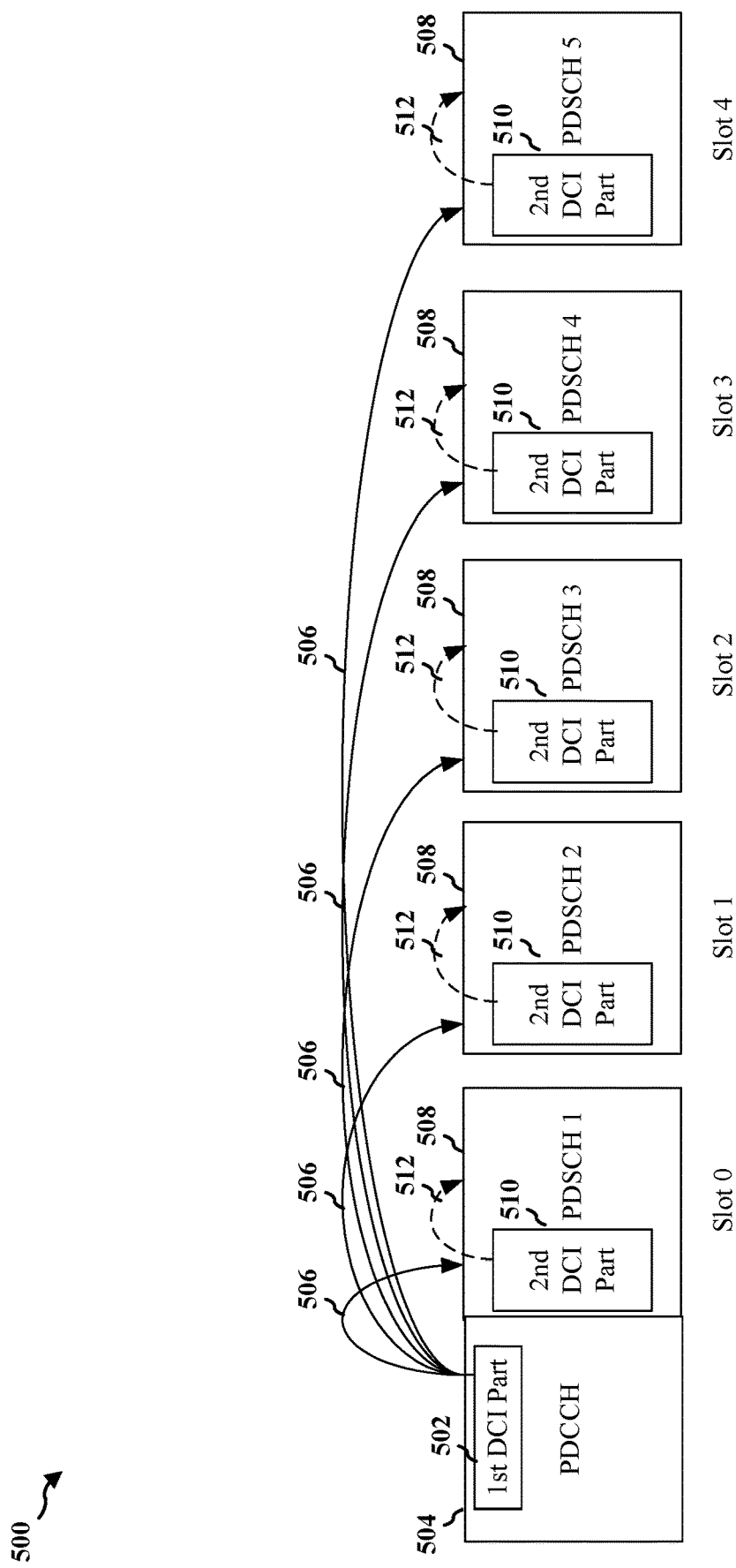
FIG. 5 is a diagram illustrating one example of a multi-stage downlink grant scheduling a plurality of data transmissions.

FIG. 5 illustrates an example 500 of a multi-stage, multi-PDSCH grant according to the first option described above. In this example, the base station may provide a first DCI part 502 to the UE in PDCCH 504 which includes scheduling information 506 for a plurality of PDSCH transmissions 508, and a second DCI part 510 which includes scheduling information 512 in each PDSCH transmission. For example, each PDSCH transmission 508 may include downlink data occupying a respective slot, and each second DCI part 510 scheduling a corresponding PDSCH transmission may be multiplexed with the downlink data in the same slot. While in the illustrated example the multi-stage downlink grant schedules five different transport blocks (e.g., PDSCH 1-5), in other examples a different number of PDSCH transmissions may be scheduled.

Figures 6A, 6B:
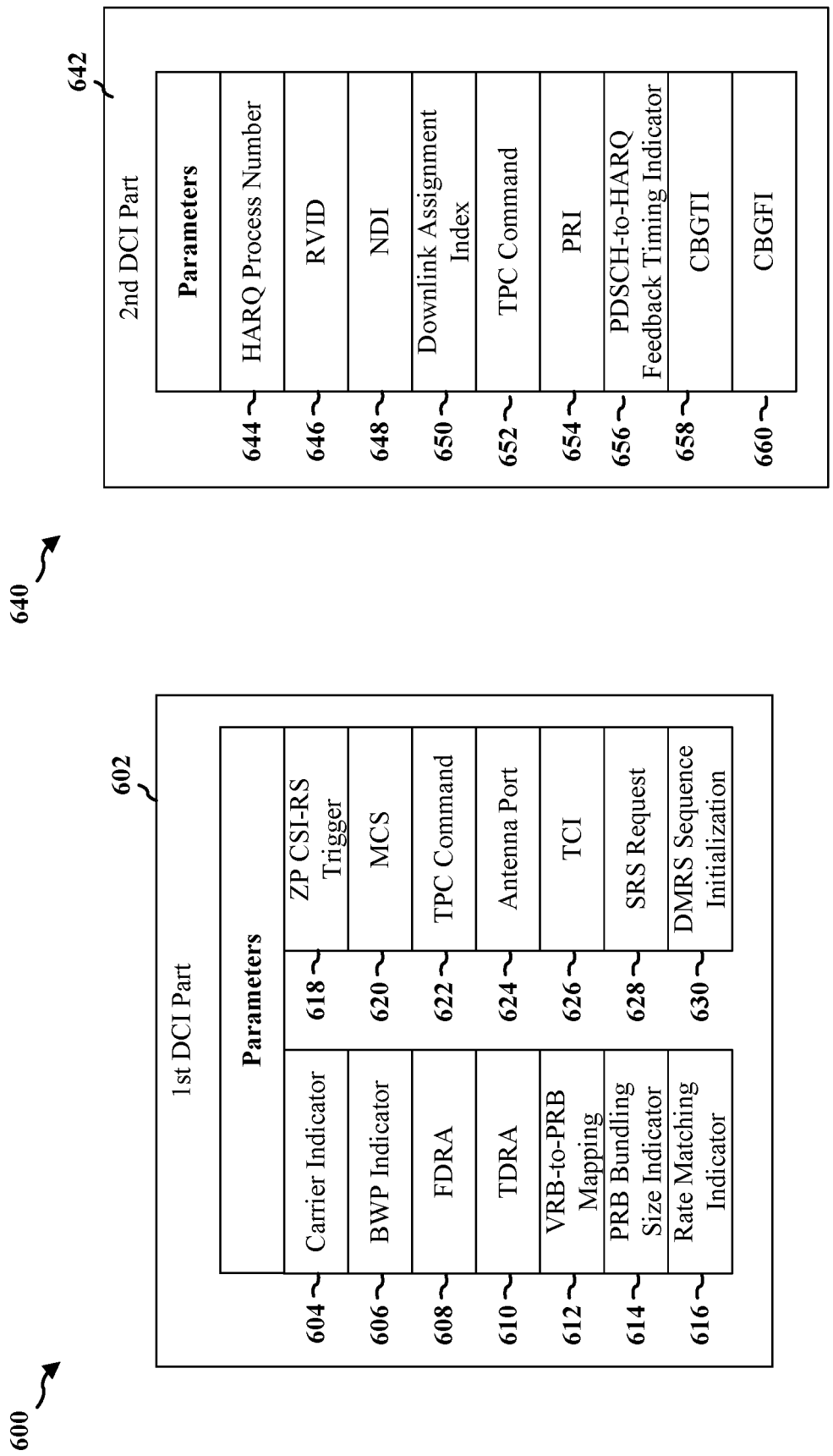
FIGS. 6A-6B are diagrams illustrating examples of scheduling information in DCI parts of the multi-stage downlink grant of FIG. 5.

FIG. 6A illustrates an example 600 of scheduling information (e.g., scheduling information 506 of FIG. 5) in a first DCI part 602 (e.g., first DCI part 502 of FIG. 5). In this example, first DCI part 602 may include any of the following parameters: a carrier indicator 604, a BWP indicator 606, FDRA 608, TDRA 610 (including DMRS structure), a VRB-to-PRB mapping 612, a PRB bundling size indicator 614, a rate matching indicator 616, a ZP CSI-RS trigger 618, a MCS 620, a TPC command 622, an antenna port 624, a TCI 626, a SRS request 628, and a DMRS sequence initialization 630. The parameters may be the same for each of the PDSCH transmissions 508. For instance, each PDSCH transmission may include the same TDRA, FDRA, MCS, DMRS structure, rate matching information, etc. Moreover, the first DCI part may include a total number of scheduled PDSCH transmissions in the multi-stage, multi-PDSCH grant (e.g., 5 PDSCH transmissions in the example of FIG. 5).

FIG. 6B illustrates an example 640 of scheduling information (e.g., scheduling information 512 of FIG. 5) in a second DCI part 642 (e.g., second DCI part 510 of FIG. 5). In this example, second DCI part 642 may include any of the following parameters: a HARQ process number 644, a RVID 646, a NDI 648, a DAI 650, a TPC command 652, a PRI 654, a PDSCH-to-HARQ feedback timing indicator 656, a CBGTI 658, and a CBGFI 660. The parameters may be different for each of the PDSCH transmissions 508. For instance, each PDSCH transmission may include different HARQ process numbers, NDI, RVID, PRI, PDSCH-to-HARQ feedback timing indicators, etc.

In one example, the base station may provide TDRA 610, FDRA 608, MCS 620, and rate matching indicator 616 in the first DCI part 602 in order to allow the UE to de-multiplex the second DCI parts 510 from the PDSCH transmissions 508. In another example, the base station may also provide these parameters in the first DCI part in order to provide for channel estimation and demodulation at the UE. In a further example, the base station may provide TCI 626 in the first DCI part in mmW environments to provide the UE sufficient time to switch analog beams prior to the scheduled PDSCH transmissions. In another example, the base station may provide SRS request 628 in the first DCI part since this parameter may not change between PDSCH transmissions 508. In a further example, the base station may provide TPC command 622 in the first DCI part to allow the UE to apply power control at a single time, prior to the scheduled PDSCH transmissions. In a further example, the base station may provide TCI 626 in the second DCI part 642 (rather than first DCI part 602) in sub-6 GHz frequency bands when the UE applies digital beamforming, since in that case the UE may switch beams during a scheduled PDSCH transmission. In another example, the base station may provide TPC command 622, 652 in both the first DCI part the second DCI part to allow the UE to apply power control for every scheduled PDSCH transmission. The base station may provide the TPC command in the second DCI part in cases where, for example, the base station receives uplink feedback from the UE during the downlink data burst (the PDSCH transmissions 508). As a result, the base station may change the TPC command for a subsequent PDSCH transmission in response to UE feedback following a prior PDSCH transmission.

Figure 7:
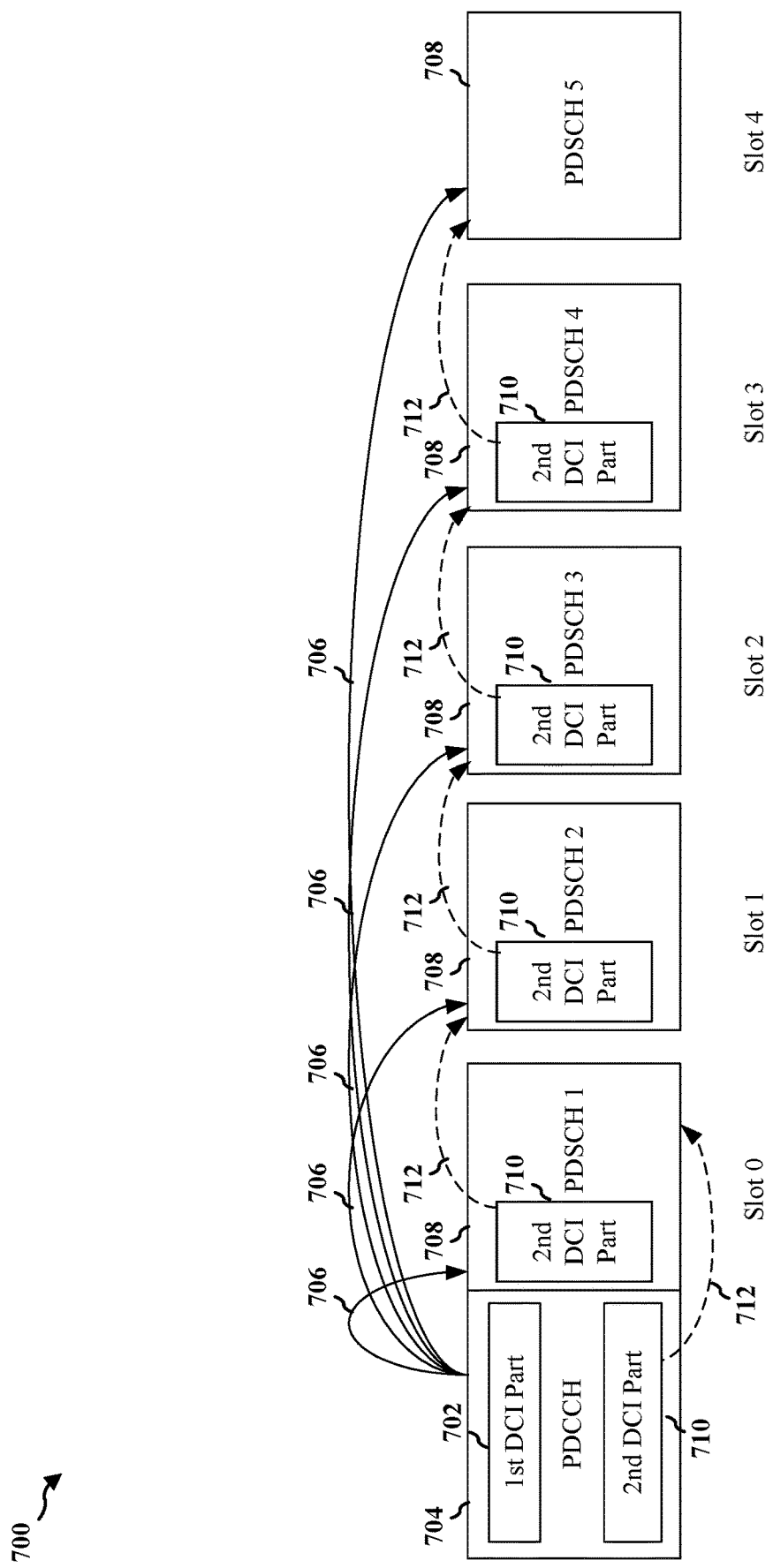
FIG. 7 is a diagram illustrating another example of a multi-stage downlink grant scheduling a plurality of data transmissions.

FIG. 7 illustrates an example 700 of a multi-stage, multi-PDSCH grant according to the second option described above. In this example, the base station may provide a first DCI part 702 to the UE in PDCCH 704 which includes scheduling information 706 for a plurality of PDSCH transmissions 708, and a second DCI part 710 which includes scheduling information 712 in PDSCH transmissions for subsequent PDSCH transmissions. For example, each PDSCH transmission 708 may include downlink data occupying a respective slot, and each second DCI part 710 scheduling a corresponding PDSCH transmission may be multiplexed with the downlink data in a prior slot. While in the illustrated example the multi-stage downlink grant schedules five different transport blocks (e.g., PDSCH 1-5), in other examples a different number of PDSCH transmissions may be scheduled.

Thus, in contrast to the example of FIG. 5 where the second DCI parts 510 are each provided in the same PDSCH transmission 508 being scheduled, in the example of FIG. 7, each second DCI part 710 is effectively shifted earlier in time by one slot. For instance, the second DCI part 710 scheduling PDSCH 5 is shifted into PDSCH 4, the second DCI part scheduling PDSCH 4 is shifted into PDSCH 3, the second DCI part scheduling PDSCH 3 is shifted into PDSCH 2, the second DCI part scheduling PDSCH 2 is shifted into PDSCH 1, and the second DCI part scheduling PDSCH 1 is shifted into the PDCCH. As a result, the last PDSCH (e.g. PDSCH 5 in this example) does not include a second DCI part.

Figures 8A, 8B:
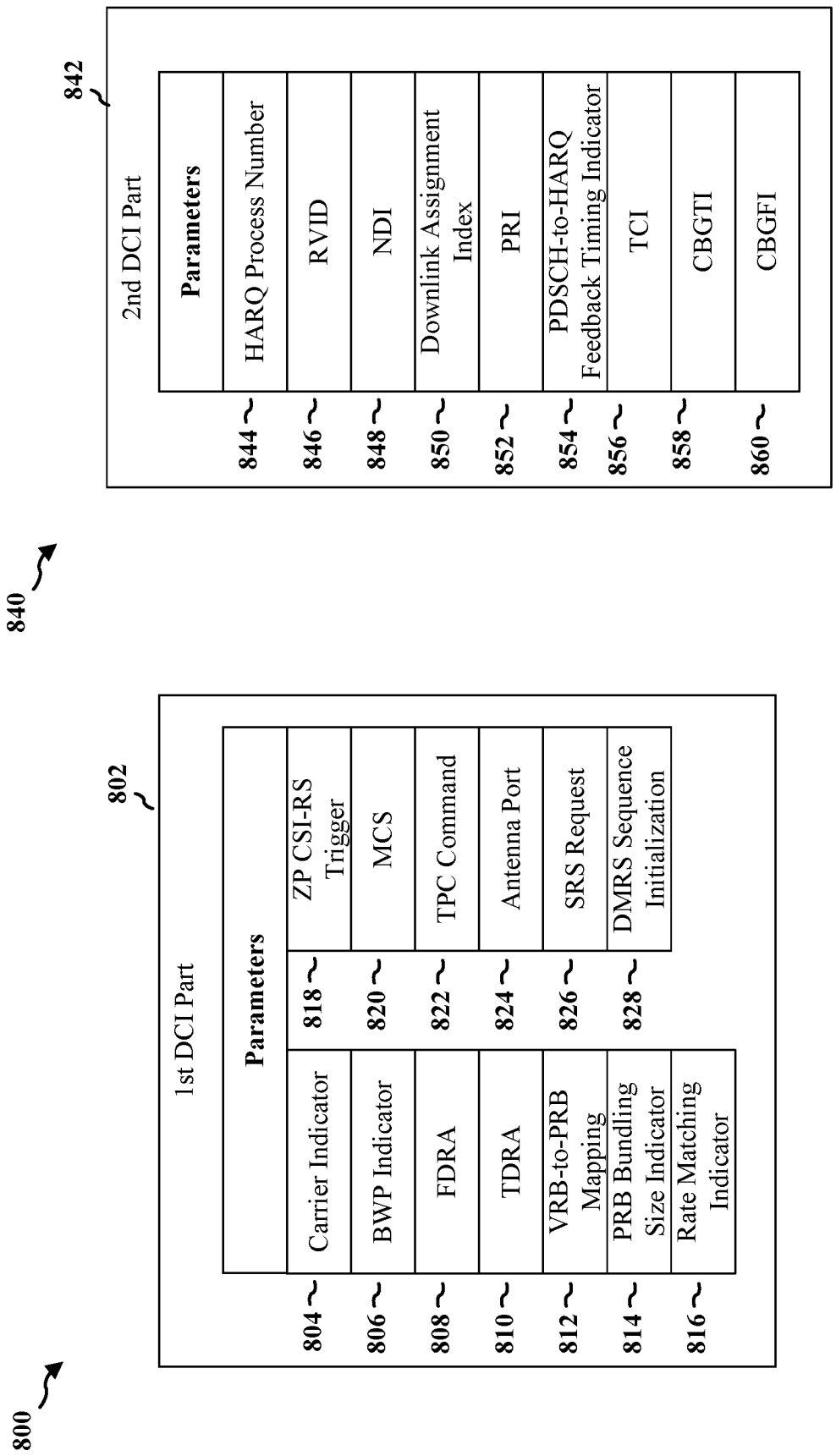
FIGS. 8A-8B are diagrams illustrating examples of scheduling information in DCI parts of the multi-stage downlink grant of FIG. 7.

FIG. 8A illustrates an example 800 of scheduling information (e.g., scheduling information 706 of FIG. 7) in a first DCI part 802 (e.g., first DCI part 702 of FIG. 7). In this example, first DCI part 802 may include any of the following parameters: a carrier indicator 804, a BWP indicator 806, FDRA 808, TDRA 810 (including DMRS structure), a VRB-to-PRB mapping 812, a PRB bundling size indicator 814, a rate matching indicator 816, a ZP CSI-RS trigger 818, a MCS 820, a TPC command 822, an antenna port 824, a SRS request 826, and a DMRS sequence initialization 828. The parameters may be the same for each of the PDSCH transmissions 708. For instance, each PDSCH transmission may include the same TDRA, FDRA, MCS, DMRS structure, rate matching information, etc. Moreover, the first DCI part may include a total number of scheduled PDSCH transmissions in the multi-stage, multi-PDSCH grant (e.g., 5 PDSCH transmissions in the example of FIG. 7).

FIG. 8B illustrates an example 840 of scheduling information (e.g., scheduling information 712 of FIG. 7) in a second DCI part 842 (e.g., second DCI part 710 of FIG. 7). In this example, second DCI part 842 may include any of the following parameters: a HARQ process number 844, a RVID 846, a NDI 848, a DAI 850, a PRI 852, a PDSCH-to-HARQ feedback timing indicator 854, a TCI 856, a CBGTI 858, and a CBGFI 860. The parameters may be different for each of the PDSCH transmissions 708. For instance, each PDSCH transmission may include different HARQ process number, NDI, RVID, PM, PDSCH-to-HARQ feedback timing indicator, etc. Moreover, in this example, TCI 856 may be provided in the second DCI part, rather than in the first DCI part as in the example of FIG. 5, since the second DCI part here is shifted earlier in time than that of FIG. 5. Therefore, the UE may have sufficient time to switch analog beams in mmW environments in response to the TCI prior to the subsequently scheduled PDSCH transmission.

In one example, the base station may provide TDRA 810, FDRA 808, MCS 820, and rate matching indicator 816 in the first DCI part 702 in order to allow the UE to de-multiplex the second DCI parts 710 from the PDSCH transmissions 708. In another example, the base station may also provide these parameters in the first DCI part in order to provide for channel estimation and demodulation at the UE. In another example, the base station may provide TPC command 822 and SRS request 826 in the first DCI part since these parameters may not change between PDSCH transmissions 708. In a further example, the base station may provide both the first DCI part 702 and second DCI part 710 in PDCCH 704 for the initially scheduled PDSCH transmission (i.e. PDSCH 1). Thus, the PDCCH may effectively include a complete DCI for PDSCH 1.

Figure 9:
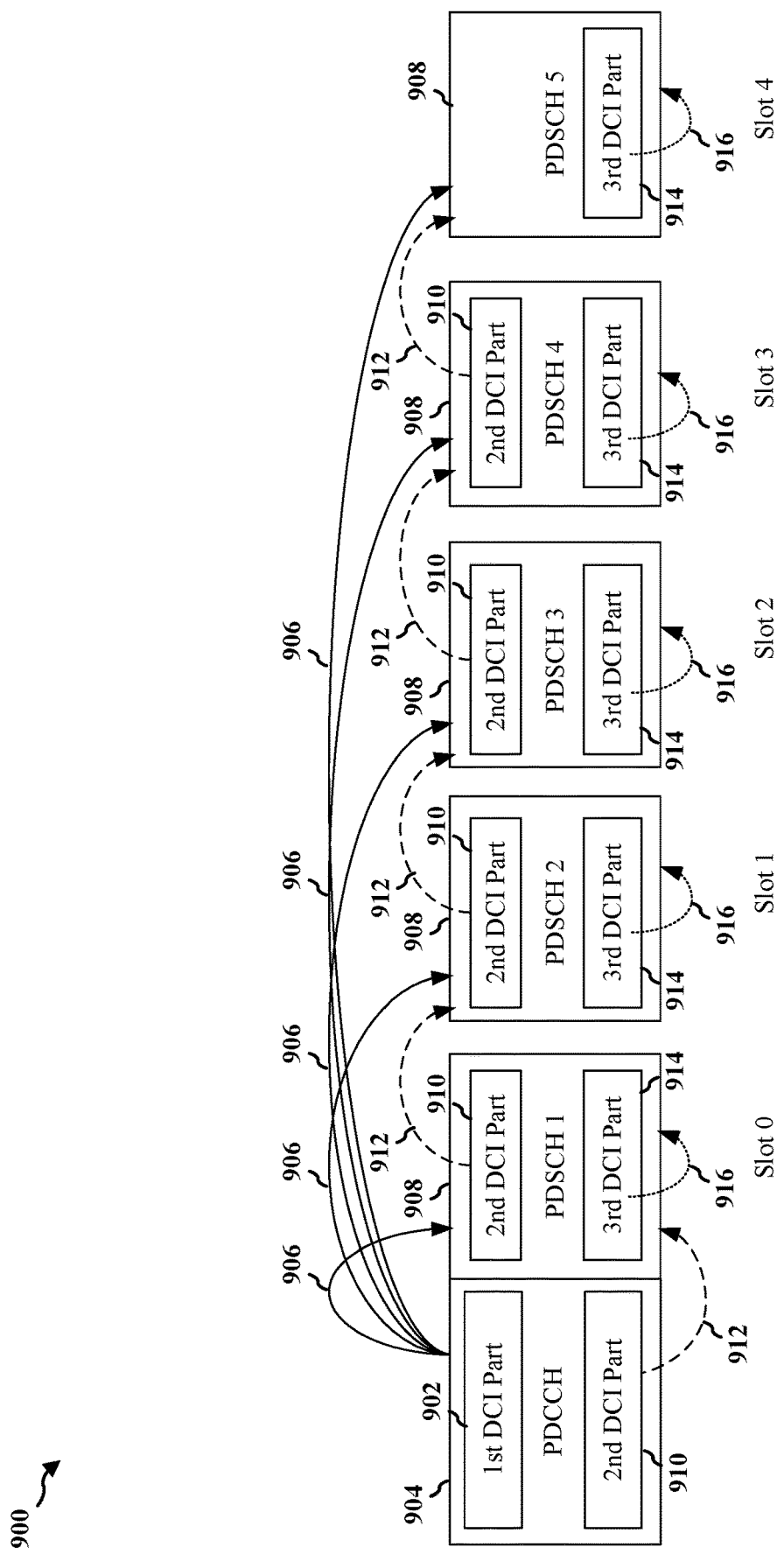
FIG. 9 is a diagram illustrating a further example of a multi-stage downlink grant scheduling a plurality of data transmissions.

FIG. 9 illustrates an example 900 of a multi-stage, multi-PDSCH grant according to the third option described above. In this example, the base station may provide a first DCI part 902 to the UE in PDCCH 904 which includes scheduling information 906 for a plurality of PDSCH transmissions 908, a second DCI part 910 which includes scheduling information 912 in PDSCH transmissions for subsequent PDSCH transmissions, and a third DCI part 914 which includes scheduling information 916 for current PDSCH transmissions. For example, each PDSCH transmission 908 may include downlink data occupying a respective slot, each second DCI part 910 scheduling a corresponding PDSCH transmission may be multiplexed with the downlink data in a prior slot, and each third DCI part 914 scheduling the corresponding PDSCH transmission may be multiplexed with the downlink data in the same slot. While in the illustrated example the multi-stage downlink grant schedules five different transport blocks (e.g., PDSCH 1-5), in other examples a different number of PDSCH transmissions may be scheduled.

Thus, the third option of the multi-stage grant described above (e.g., in example 900) effectively serves as a combination of the first and second options (e.g., respectively depicted in examples 500 and 700). The combined approach allows the base station to make advance scheduling decisions for a corresponding PDSCH transmission in the second DCI part 910, as well as spontaneous scheduling decisions for the same PDSCH transmission in the third DCI part 914. For instance, assume in the illustrated example that, after the base station transmits PDCCH, PDSCH 1, PDSCH 2, and PDSCH 3, and before transmitting PDSCH 4, the base station determines scheduling information (e.g., TDRA, FDRA, MCS, etc.) for PDSCH 5 and transmits such information in the second DCI part 910 of PDSCH 4. If during that slot (e.g., PDSCH 4) the base station subsequently receives a NACK from the UE in response to an earlier PDSCH (e.g., PDSCH 1, 2, 3, or 4), the base station may determine to retransmit the data of the earlier PDSCH in the scheduled transmission of PDSCH 5. Accordingly, the base station may configure corresponding scheduling information (e.g., HARQ process number, NDI, RVID) and transmit such information in the third DCI part 914 of PDSCH 5. In this way, the base station may flexibly schedule a retransmission of prior data in a previously indicated PDSCH transmission, without having to wait to issue a subsequent multi-PDSCH grant as in the conventional grants described above. Alternatively, if during that slot (e.g., PDSCH 4) the base station subsequently receives an ACK from the UE in response to an earlier PDSCH (e.g., PDSCH 1, 2, 3, or 4), the base station may determine to transmit new data in PDSCH 5 and configure the scheduling information (e.g., HARQ process number, NDI, RVID) in the third DCI part to indicate a new PDSCH transport block and HARQ process ID accordingly.

Figures 10A, 10B, 10C:
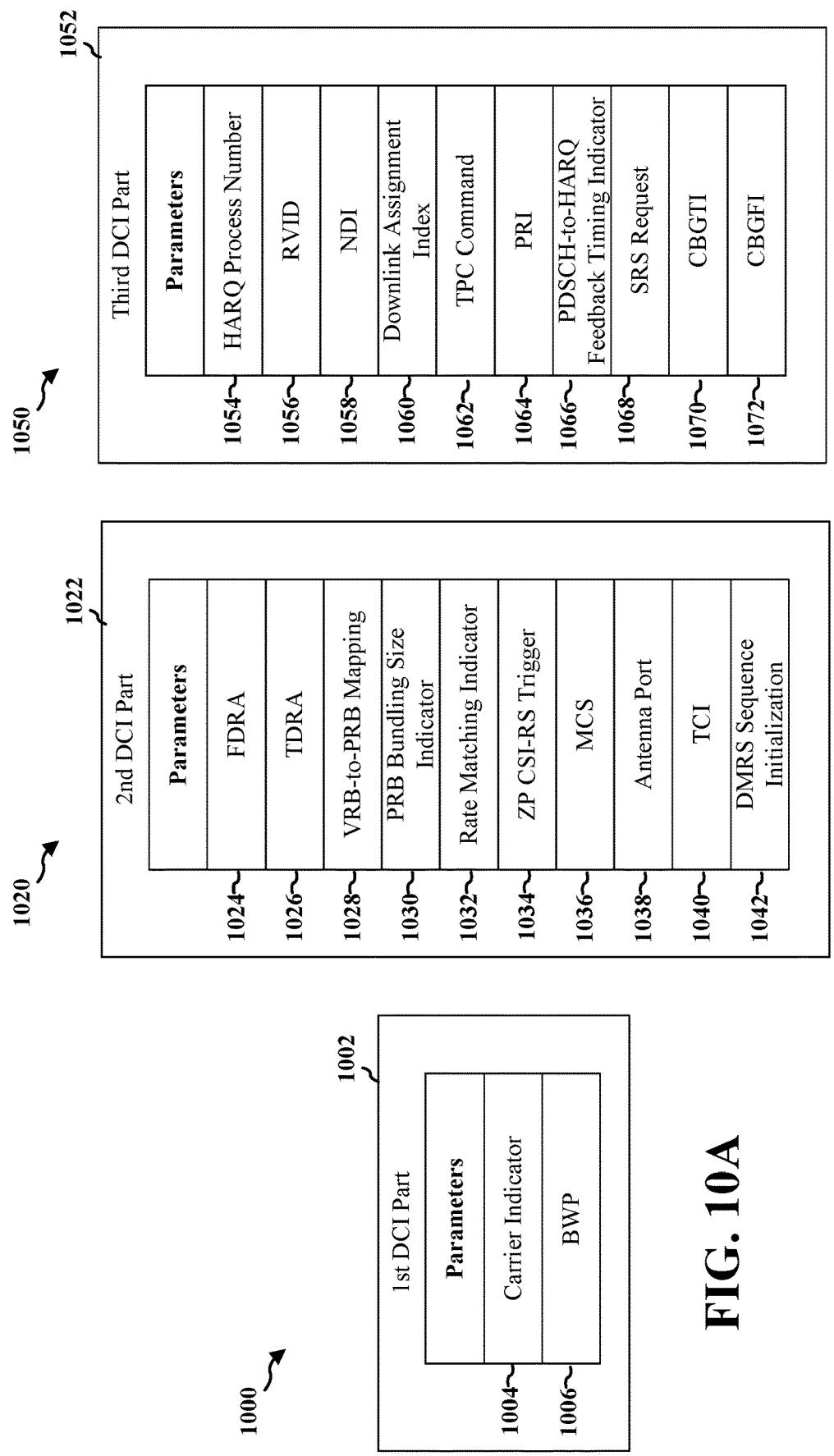
FIGS. 10A-10C are diagrams illustrating examples of scheduling information in DCI parts of the multi-stage downlink grant of FIG. 9.

FIG. 10A illustrates an example 1000 of scheduling information (e.g., scheduling information 906 of FIG. 9) in a first DCI part 1002 (e.g., first DCI part 902 of FIG. 9). In this example, first DCI part 1002 may include any of the following parameters: a carrier indicator 1004 and a BWP indicator 1006. The parameters may be the same for each of the PDSCH transmissions 908. For instance, each PDSCH transmission may include the same carrier indicator and BWP indicator. Moreover, the first DCI part may include a total number of scheduled PDSCH transmissions in the multi-stage, multi-PDSCH grant (e.g., 5 PDSCH transmissions in the example of FIG. 9).

FIG. 10B illustrates an example 1020 of scheduling information (e.g., scheduling information 912 of FIG. 9) in a second DCI part 1022 (e.g., second DCI part 910 of FIG. 9). In this example, second DCI part 1022 may include any of the following parameters: FDRA 1024, TDRA 1026 (including DMRS structure), a VRB-to-PRB mapping 1028, a PRB bundling size indicator 1030, a rate matching indicator 1032, a ZP CSI-RS trigger 1034, a MCS 1036, an antenna port 1038, a TCI 1040, and a DMRS sequence initialization 1042. The parameters may be different for each of the PDSCH transmissions 908. For instance, each PDSCH transmission may include different FDRA, TDRA, MCS, etc.

FIG. 10C illustrates an example 1050 of scheduling information (e.g., scheduling information 916 of FIG. 9) in a third DCI part 1052 (e.g., third DCI part 914 of FIG. 9). In this example, third DCI part 1052 may include any of the following parameters: a HARQ process number 1054, a RVID 1056, a NDI 1058, a DAI 1060, a TPC command 1062, a PRI 1064, a PDSCH-to-HARQ feedback timing indicator 1066, a SRS request 1068, a CBGTI 1070, and a CBGFI 1072. The parameters may be different for each of the PDSCH transmissions 908. For instance, each PDSCH transmission may include different HARQ process number, NDI, RVID, PRI, PDSCH-to-HARQ feedback timing indicator, etc.

In one example, the base station may provide both the first DCI part 902 and second DCI part 910 in PDCCH 904 for the initially scheduled PDSCH transmission (i.e. PDSCH 1). Thus, the PDCCH may include, for instance, the total number of scheduled PDSCH transmissions, and the TDRA, FDRA, and MCS for PDSCH 1. In another example, the base station may provide TCI, TDRA, FDRA, and MCS in the second DCI part for each subsequently scheduled PDSCH transmission (e.g., PDSCH 2, 3, 4 and 5). Thus, PDSCH 1 may include the second DCI part for PDSCH 2, PDSCH 2 may include the second DCI part for PDSCH 3, PDSCH 3 may include the second DCI part for PDSCH 4, and PDSCH 4 may include the second DCI part for PDSCH 5. The last PDSCH (e.g. PDSCH 5 in this example) does not include a second DCI part. Accordingly, unlike the previous options described above where the PDCCH includes TDRA, FDRA, and MCS and other time-critical information for all scheduled PDSCH transmissions, in this example the time-critical information is provided in PDSCH, namely in the second DCI part for each PDSCH transmission. As a result, the multi-stage downlink grant may schedule subsequent PDSCH transmissions with more flexibility (e.g., different TDRA, FDRA, MCS, etc.) in comparison to the previous options.

Thus, the multi-stage multi-PDSCH grant described above with respect to FIGS. 5-10C may provide multiple benefits over single-stage multi-PDSCH grants. These benefits may include, for instance, earlier retransmission of PDSCH transport blocks scheduled by prior or current multi-PDSCH grants, dynamic TCI state changes between PDSCH transmissions in a current downlink data burst, and flexible PRIs and PDSCH-to-HARQ feedback timing indicators for different PDSCH transmissions. Examples of these benefits are described below. While all of the following examples reference the third option of the multi-stage downlink grant for illustration (e.g., the example of FIG. 9), they may similarly apply to the other aforementioned options (e.g., the examples of FIG. 5 or 7).

In one example, the base station may retransmit a PDSCH transport block from an earlier downlink data burst scheduled by a prior multi-PDSCH grant. For instance, referring to FIG. 9, assume in one example that before the base station provides PDCCH 904 including first DCI part 902 to the UE, the base station has received a NACK from the UE in response to a prior PDSCH transmission. In such case, the base station may later decide to re-transmit the prior PDSCH transmission in the current multi-stage, multi-PDSCH grant by configuring the retransmission accordingly in the second DCI part 910.

Similarly, the base station may retransmit a previous PDSCH transport block from a current downlink data burst scheduled by the same multi-PDSCH grant. For instance, referring to FIG. 9, assume in one example that the base station configures the second DCI part 910 of each PDSCH transmission 908 to have a PDSCH-to-HARQ feedback indicator of 0 (i.e., K1=0), and thus the base station may receive HARQ feedback from the UE in the same slot as each corresponding PDSCH transmission. Moreover, assume in this example that the base station has received a NACK from the UE in response to PDSCH 2 and before transmitting PDSCH 3 (as a result of K1=0). In single-stage multi-PDSCH grants, the base station would only be able to retransmit PDSCH 2 after transmitting PDSCH 3, 4, and 5, after which time the base station can provide a subsequent multi-PDSCH grant rescheduling PDSCH 2. However, with the multi-stage downlink grant, the base station may be able to re-transmit that transport block earlier (e.g., in PDSCH 3, 4, or 5) by configuring the retransmission accordingly in the second DCI part 910.

In another example, the base station may change TCI between PDSCH transmissions scheduled by the same multi-PDSCH grant. For instance, referring to FIG. 9, assume in one example that the base station decides to switch transmission beams for its downlink data between PDSCH 1 and PDSCH 2. With the multi-stage downlink grant, the base station may configure a different TCI accordingly for PDSCH 2 by altering its value in the second DCI part 910 of PDSCH 1. The UE may thus have sufficient time to process the TCI and switch analog beams prior to receiving PDSCH 2.

In a further example, the base station may dynamically configure different PRIs or PDSCH to HARQ feedback timing indicators for each PDSCH transmission. For instance, referring to FIG. 9, assume in one example that the base station decides to receive HARQ feedback from the UE for PDSCH 1 in slot 0, and later on decides to receive HARQ feedback from the UE in PDSCH 2 and 3 together in slot 2. With the multi-stage downlink grant, the base station may dynamically configure the different HARQ feedback timings for these PDSCH transmissions by setting the PRI or K1 value accordingly in the respective second DCI parts. For instance, the base station may configure K1=0 in the second DCI part for PDSCH 1 (during the PDCCH), K1=1 in the second DCI part for PDSCH 2 (during slot 0), and K1=0 in the second DCI part for PDSCH 3 (during slot 1). In this way, flexible HARQ feedback control may be achieved.

Accordingly, in the various options of the multi-stage, multi-PDSCH grant described above with respect to FIGS. 5-10C, additional scheduling flexibility may be achieved in comparison to single-stage multi-PDSCH grants. In the first option described above with respect to FIG. 5, the base station may flexibly piggyback incremental information such as HARQ process numbers, RVIDs, and NDIs in each PDSCH transmission being scheduled (e.g., in the second DCI part). However, certain parameters such as TCI are set in PDCCH and may not be changed during the downlink data burst, and the UE may experience a delay in decoding PDSCH transmissions in response to decoding each second DCI part during the corresponding PDSCH transmission. In the second option described above with respect to FIG. 7, the base station may not piggyback HARQ process numbers, RVIDs and NDIs in the same PDSCH transmission being scheduled, since the second DCI part for that transmission is in a preceding slot. Thus, the base station's scheduling decisions are performed in advance by at least one prior slot, reducing the impact of PDSCH decoding delay from second DCI parts. Moreover, the base station may flexibly change TCI during the downlink burst in this option (e.g., in the second DCI part). In the third option described above with respect to FIG. 9, the base station may flexibly piggyback HARQ process numbers, RVIDs, and NDIs in each PDSCH transmission being scheduled (e.g., in the third DCI part) as well as flexibly change TCI during the downlink burst (e.g., in the second DCI part). Thus, the third option may provide more scheduling flexibility than the first and second options.

However, the UE may still experience a delay in decoding PDSCH transmissions in response to decoding each third DCI part.

Figure 11:
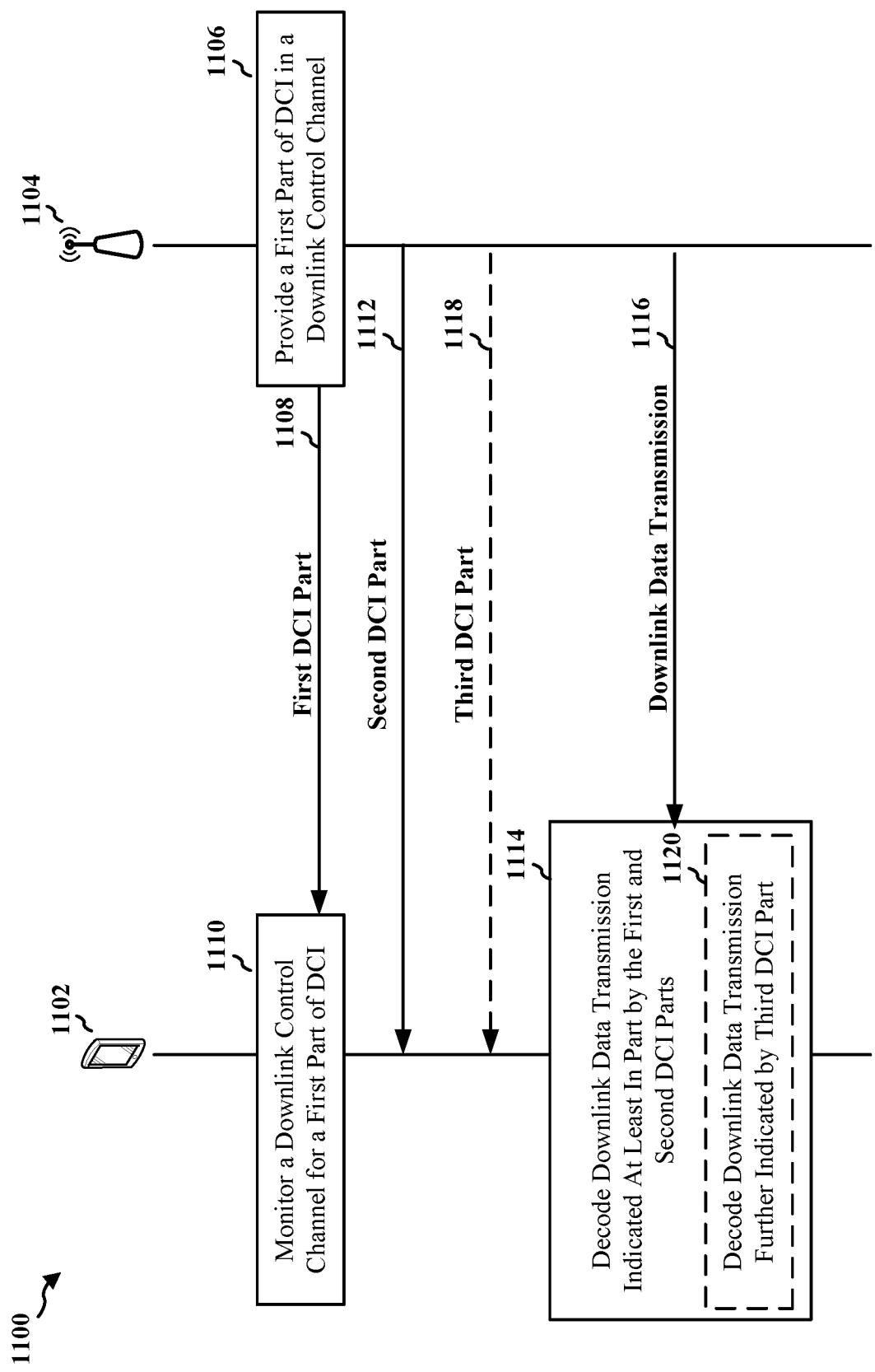
FIG. 11 is a diagram illustrating a call flow between a UE and a base station.

FIG. 11 illustrates a call flow diagram 1100 between a UE 1102 and a base station 1104. At 1106, the base station provides a first DCI part 1108 in a downlink control channel to the UE. For example, referring to FIGS. 5-10C, the base station may provide first DCI part 502, 602, 702, 802, 902, 1002 in PDCCH 504, 704, 904 to the UE. For instance, referring to FIG. 3, the controller/processor 375 or TX processor 316 of base station 310 may provide the first DCI part in PDCCH to the UE 350 by attaching a cyclic redundancy check (CRC) to the first DCI part, masking the CRC with a radio network temporary identifier (RNTI), modulating the CRC attached, first DCI part using a modulation scheme (e.g., QPSK, 16QAM, etc.), mapping the modulated symbols to one or more control channel elements (CCEs) in a control resource set (CORESET) as a PDCCH, and transmitting the CORESET including the first DCI part to the UE through one or more respective antennas 320.

At 1110, the UE 1102 monitors a downlink control channel for the first DCI part 1108. For example, referring to FIGS. 5-10C, the UE may monitor PDCCH 504, 704, 904 for first DCI part 502, 602, 702, 802, 902, 1002. For instance, referring to FIG. 3, the controller/processor 359 or RX processor 356 of UE 350 may monitor PDCCH for the first DCI part by performing blind decoding for a set of PDCCH candidates in one or more search space (SS) sets which are mapped to the CCE(s) of the CORESET including the first DCI part. As an example, during each monitoring occasion of an SS set, the controller/processor 359 or RX processor 356 may attempt to decode one or more PDCCH candidates in increasing order of aggregation level (e.g., one CCE during a first subframe or slot, two CCEs during a second subframe or slot, four CCEs during a third subframe or slot, etc.) by attempting to demask the CRC of the PDCCH candidate(s) using a RNTI of the UE. If demasking is successful (e.g. no CRC error is detected), the controller/processor 359 or RX processor 356 may determine that decoding was successful and subsequently obtain the first DCI part.

After obtaining the first DCI part 1108, the UE 1102 obtains a second DCI part 1112 sent from the base station 1104. For example, referring to FIGS. 5-10C, the UE may obtain second DCI part 510, 642, 710, 842, 910, 1022 in one of the PDSCH transmissions 508, 708, 908. For instance, referring to FIG. 3, the controller/processor 375 or TX processor 316 of base station 310 may send the second DCI part by, for example, multiplexing the second DCI part in allocated resources of a PDSCH transmission and transmitting a signal carrying the second DCI part and the PDSCH transmission to UE 350 through one or more respective antennas 320. Similarly, the controller/processor 359 or RX processor 356 of UE 350 may obtain the second DCI part by, for example, receiving a signal carrying the PDSCH transmission from base station 310 through one or more respective antennas 352, and demultiplexing the second DCI part from the received PDSCH transmission.

Next, at 1114, the UE 1102 decodes a downlink data transmission 1116 from base station 1104 which is indicated at least in part by the first DCI part 1108 and the second DCI part 1112. For example, referring to FIGS. 5-10C, the UE may decode one of the PDSCH transmissions 508, 708, 908 based on the scheduling information 506, 706, 906 in the first DCI part 502, 602, 702, 802, 902, 1002, or based on the scheduling information 512, 712, 912 in the second DCI part 510, 642, 710, 842, 910, 1022 corresponding to that PDSCH transmission. For instance, referring to FIG. 3, the controller/processor 359 or RX processor 356 of the UE 350 may decode the PDSCH transmission by demodulating the data in the allocated resources identified in the first or second DCI part (e.g., in TDRA and FDRA) and according to the modulation scheme identified in the first or second DCI part (e.g., in MCS). The controller/processor 359 or RX processor 356 may also decode the PDSCH transmission by performing other steps in addition to demodulation, for example, layer demapping, descrambling, or CRC calculations. In addition to TDRA, FDRA, and MCS, the first and second DCI parts may indicate other scheduling parameters for the PDSCH transmission (e.g., BWP indicator, TCI, NDI, HARQ process number, RVID, etc.). Thus, the UE may decode the downlink data in the PDSCH transmission scheduled in combination by the first and second DCI parts.

Additionally, after obtaining the second DCI part 1112, the UE 1102 may obtain a third DCI part 1118 sent from the base station 1104. For example, referring to FIGS. 9-10C, the UE may obtain third DCI part 914, 1052 in one of the PDSCH transmissions 908. For instance, referring to FIG. 3, the controller/processor 375 or TX processor 316 of base station 310 may send the third DCI part by, for example, multiplexing the third DCI part in allocated resources of a PDSCH transmission and transmitting a signal carrying the third DCI part and the PDSCH transmission to UE 350 through one or more respective antennas 320. Similarly, the controller/processor 359 or RX processor 356 of UE 350 may obtain the third DCI part by, for example, receiving a signal carrying the PDSCH transmission from base station 310 through one or more respective antennas 352, and demultiplexing the third DCI part from the received PDSCH transmission.

In such case, at 1120, the UE 1102 may decode the downlink data transmission 1116 further indicated by the third DCI part 1118. For example, referring to FIGS. 9-10C, when the UE decodes one of the PDSCH transmissions 908 based on scheduling information in the first DCI part 902 or second DCI part 910, that PDSCH transmission may also include scheduling information 916 in the third DCI part 914, 1052 corresponding to that PDSCH transmission (e.g., NDI, HARQ process number, RVID, etc.). For instance, referring to FIG. 3, the controller/processor 359 or RX processor 356 of the UE 350 may decode the PDSCH transmission by demodulating the data in the allocated resources identified in the second DCI part (e.g., in TDRA and FDRA) and according to the modulation scheme identified in the second DCI part (e.g., in MC S). The controller/processor 359 or RX processor 356 may also decode the PDSCH transmission by performing other steps in addition to demodulation, for example, layer demapping, descrambling, or CRC calculations. Thus, the UE may decode the downlink data in the PDSCH transmission scheduled in combination by the first, second, and third DCI parts.

Figure 12:
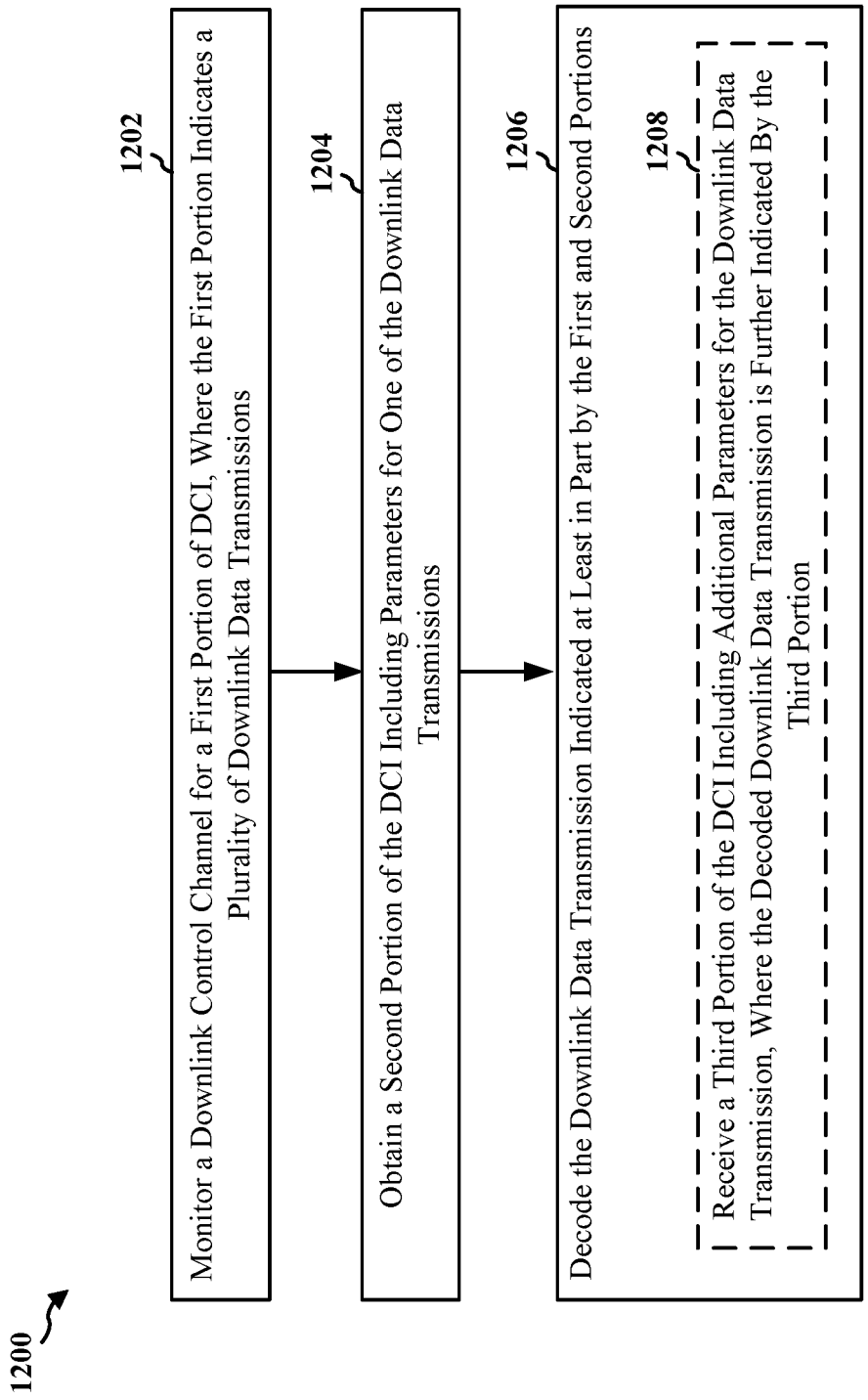
FIG. 12 is a flowchart of a method of wireless communication.

FIG. 12 is a flowchart 1200 of a method of wireless communication. The method may be performed by a UE (e.g., the UE 104, 350, 1102; the apparatus 1402). Optional aspects are illustrated in dashed lines. The method allows a UE to obtain downlink data from a base station in a multi-stage, multi-PDSCH grant with more scheduling flexibility than single-stage multi-PDSCH grants.

At 1202, the UE monitors a downlink control channel for a first portion of downlink control information, where the first portion of downlink control information indicates a plurality of downlink data transmissions. For example, 1202 may be performed by PDCCH monitor component 1440 of FIG. 14. For instance, as described above with respect to FIG. 11, at 1110, the UE 1102 may monitor a downlink control channel (e.g., PDCCH 504, 704, 904) for a first DCI part 1108 (e.g., first DCI part 502, 602, 702, 802, 902, 1002). The first DCI part may indicate multiple PDSCH transmissions 508, 708, 908. For example, the first DCI part may include scheduling information 506, 706, 906 for the PDSCH transmissions 508, 708, 908, such as a total number of the scheduled PDSCH transmissions, carrier indicator, BWP, TDRA, FDRA, MCS, etc.

In one example, the first portion of the downlink control information may include common parameters for the plurality of downlink data transmissions, where the common parameters include one or more of: a carrier indicator; a bandwidth part indicator; a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); a transmission power control (TPC) command; an antenna port; a transmission configuration indication (TCI); a sounding reference signal (SRS) request; or a demodulation reference signal (DMRS) sequence initialization. For instance, referring to FIGS. 5 and 6A, the first DCI part 502, 602 may include any of the following parameters for PDSCH transmissions 508: a carrier indicator 604, a BWP indicator 606, FDRA 608, TDRA 610 (including DMRS structure), a VRB-to-PRB mapping 612, a PRB bundling size indicator 614, a rate matching indicator 616, a ZP CSI-RS trigger 618, a MCS 620, a TPC command 622, an antenna port 624, a TCI 626, a SRS request 628, and a DMRS sequence initialization 630. The parameters may be common parameters (e.g., have the same value) for each of the PDSCH transmissions 508. For instance, each PDSCH transmission may include the same TDRA, FDRA, MCS, DMRS structure, rate matching information, etc.

In one example, the first portion of the downlink control information may include common parameters for the plurality of downlink data transmissions, where the common parameters include one or more of: a carrier indicator; a bandwidth part indicator; a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); a transmission power control (TPC) command; an antenna port; a sounding reference signal (SRS) request; or a demodulation reference signal (DMRS) sequence initialization. For instance, referring to FIGS. 7 and 8A, the first DCI part 702, 802 may include any of the following parameters for PDSCH transmissions 708: a carrier indicator 804, a BWP indicator 806, FDRA 808, TDRA 810 (including DMRS structure), a VRB-to-PRB mapping 812, a PRB bundling size indicator 814, a rate matching indicator 816, a ZP CSI-RS trigger 818, a MCS 820, a TPC command 822, an antenna port 824, a SRS request 826, and a DMRS sequence initialization 828. The parameters may be common parameters (e.g., have the same value) for each of the PDSCH transmissions 708. For instance, each PDSCH transmission may include the same TDRA, FDRA, MCS, DMRS structure, rate matching information, etc.

In one example, the first portion of the downlink control information may include common parameters for the plurality of downlink data transmissions, the common parameters including one or more of: a carrier indicator; or a bandwidth part indicator. For instance, referring to FIGS. 9 and 10A, the first DCI part 902, 1002 may include any of the following parameters for PDSCH transmissions 908: a carrier indicator 1004 and a BWP indicator 1006. The parameters may be common parameters (e.g., have the same value) for each of the PDSCH transmissions 908. For instance, each PDSCH transmission may include the same carrier indicator and BWP indicator.

At 1204, the UE obtains a second portion of the downlink control information including parameters for one of the downlink data transmissions. For example, 1204 may be performed by DCI portion reception component 1442 of FIG. 14. For instance, as described above with respect to FIG. 11, the UE 1102 may obtain from base station 1104 a second DCI part 1112 (e.g., second DCI part 510, 642, 710, 842, 910, 1022) scheduling one of the PDSCH transmissions (e.g., PDSCH transmissions 508, 708, 908). The second DCI part may include scheduling information 512, 712, 912 for a corresponding one of the PDSCH transmissions, such as HARQ process number, RVID, NDI, FDRA, TDRA, MCS, etc.

In one example, the first portion of the downlink control information may indicate allocated resources for the one of the downlink data transmissions, and the second portion of the downlink control information may be multiplexed with the one of the downlink data transmissions in the allocated resources. For instance, referring to FIGS. 5 and 6A, the first DCI part 502, 602 may indicate assigned frequency and time resources (e.g., FDRA 608 and TDRA 610) for any of the PDSCH transmissions 508, and the second DCI part 510, 610 may be multiplexed in the frequency and time resources of the PDSCH transmission 508 that the second DCI part is scheduling. For example, as illustrated in FIG. 5, the second DCI part 510 scheduling a PDSCH transmission may be contained within the same slot as that PDSCH transmission.

In one example, the parameters of the second portion of the downlink control information may include one or more of: a hybrid automatic repeat request (HARQ) process number; a redundancy version (RVID); a new data indicator (NDI); a downlink assignment index; a transmission power control (TPC) command; a physical uplink control channel (PUCCH) resource indicator (PRI); a physical downlink shared channel (PDSCH) to HARQ feedback timing indicator; code block group transmission information (CBGTI); or code block group flushing out information (CBGFI). For instance, referring to FIGS. 5 and 6B, the second DCI part 510, 642 may include any of the following parameters: a HARQ process number 644, a RVID 646, a NDI 648, a DAI 650, a TPC command 652, a PRI 654, a PDSCH-to-HARQ feedback timing indicator 656, a CBGTI 658, and a CBGFI 660. The parameters may be different for each of the PDSCH transmissions 508.

In one example, the second portion of the downlink control information may be received in a slot prior to the one of the downlink data transmissions. For instance, referring to FIG. 7, the second DCI part 710 may be received in a slot prior to the PDSCH transmission 708 being scheduled. For example, as illustrated in FIG. 7, each PDSCH transmission 708 may include downlink data occupying a respective slot, and each second DCI part 710 scheduling a corresponding PDSCH transmission may be multiplexed with the downlink data in a prior slot.

In one example, the parameters of the second portion of the downlink control information may include one or more of: a hybrid automatic repeat request (HARQ) process number; a redundancy version (RVID); a new data indicator (NDI); a downlink assignment index; a physical uplink control channel (PUCCH) resource indicator (PRI); a physical downlink shared channel (PDSCH) to HARQ feedback timing indicator; a transmission configuration indication (TCI); code block group transmission information (CBGTI); or code block group flushing out information (CBGFI). For instance, referring to FIGS. 7 and 8B, the second DCI part 710, 842 may include any of the following parameters: a HARQ process number 844, a RVID 846, a NDI 848, a DAI 850, a PRI 852, a PDSCH-to-HARQ feedback timing indicator 854, a TCI 856, a CBGTI 858, and a CBGFI 860. The parameters may be different for each of the PDSCH transmissions 708.

In one example, the plurality of downlink data transmissions may comprise N transmissions, where the second portion of the downlink control information indicating an initial one of the N transmissions is multiplexed with the first portion of the downlink control information in the downlink control channel, and the second portion of the downlink control information indicating an $n^{th}$ one of the N transmissions is multiplexed in allocated resources for an $(n-1)^{th}$ one of the N transmissions, where $1 < n \leq N$. For example, as illustrated in FIG. 7, the multi-stage downlink grant may schedule multiple PDSCH transmissions 708, in this case five (PDSCH 1, 2, 3, 4, 5, or N=5), although in other examples a different number N of PDSCH transmissions may be scheduled. In such example, the second DCI part 710 scheduling the initial PDSCH transmission (PDSCH 1) may be multiplexed with the first DCI part 702 in PDCCH 704, and the second DCI part scheduling a current (e.g., $n^{th}$) one of the remaining PDSCH transmissions may be multiplexed in the assigned time and frequency resources for a previous (e.g., $(n-1)^{th}$) one of the five PDSCH transmissions. For instance, the second DCI part 710 scheduling PDSCH 5 may be within the slot carrying PDSCH 4, the second DCI part scheduling PDSCH 4 may be within the slot carrying PDSCH 3, the second DCI part scheduling PDSCH 3 may be within the slot carrying PDSCH 2, and the second DCI part scheduling PDSCH 2 may be within the slot carrying PDSCH 1.

In one example, the parameters of the second portion of the downlink control information may include one or more of: a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); an antenna port; a transmission configuration indication (TCI); or a demodulation reference signal (DMRS) sequence initialization. For instance, referring to FIGS. 9 and 10B, the second DCI part 910, 1022 may include any of the following parameters: FDRA 1024, TDRA 1026 (including DMRS structure), a VRB-to-PRB mapping 1028, a PRB bundling size indicator 1030, a rate matching indicator 1032, a ZP CSI-RS trigger 1034, a MCS 1036, an antenna port 1038, a TCI 1040, and a DMRS sequence initialization 1042. The parameters may be different for each of the PDSCH transmissions 908.

At 1206, the UE decodes the one of the downlink data transmissions indicated at least in part by the first portion of the downlink control information and the second portion of the downlink control information. For example, 1206 may be performed by PDSCH decode component 1444 of FIG. 14. For instance, as described above with respect to FIG. 11, at 1114, the UE 1102 may decode a downlink data transmission 1116 (e.g., PDSCH transmission 508, 708, 908)

from base station 1104. The first DCI part 502, 602, 702 may include scheduling information 506, 706, 906 (e.g., FDRA, TDRA, MCS) for that PDSCH transmission, and the second DCI part 510, 642, 710, 842, 910, 1022 may include scheduling information 512, 712, 912 (e.g., HARQ process number, NDI, RVID) for that PDSCH transmission. Thus, the UE may decode the downlink data in the PDSCH transmission 508, 708, 908 scheduled in combination by the first and second DCI parts.

At 1208, the UE may obtain a third portion of the downlink control information including additional parameters for the one of the downlink data transmissions, where the decoded one of the downlink data transmissions is further indicated by the third portion of the downlink control information. For example, 1208 may also be performed by DCI portion reception component 1442 of FIG. 14. For instance, as described above with respect to FIG. 11, after obtaining the second DCI part 1112 (e.g., including FDRA, TDRA, MCS, etc.), the UE 1102 may also obtain third DCI part 1118 (e.g., third DCI part 914, 1052) scheduling one of the PDSCH transmissions (e.g., PDSCH transmissions 908). The third DCI part may include scheduling information 916 for a corresponding one of the PDSCH transmissions in addition to the second DCI part, such as HARQ process number, RVID, NDI, DAI, PRI, K1, etc. Then, as described above with respect to FIG. 11 at 1120, the UE 1102 may decode the downlink data transmission 1116. Thus, the UE may decode the downlink data in the PDSCH transmission scheduled in combination by the first, second, and third DCI parts.

In one example, the second portion of the downlink control information may indicate allocated resources for the one of the downlink data transmissions, and the third portion of the downlink control information may be multiplexed with the one of the downlink data transmissions in the allocated resources. For instance, referring to FIGS. 9, 10B and 10C, the second DCI part 910, 1022 may indicate assigned frequency and time resources (e.g., FDRA 1024 and TDRA 1026) for any of the PDSCH transmissions 908, and the third DCI part 914, 1052 may be multiplexed in the frequency and time resources of the PDSCH transmission 908 that the third DCI part is scheduling. For example, as illustrated in FIG. 9, the third DCI part 914 scheduling a PDSCH transmission may be contained within the same slot as that PDSCH transmission.

In one example, the additional parameters of the third portion of the downlink control information may include one or more of: a hybrid automatic repeat request (HARQ) process number; a redundancy version (RVID); a new data indicator (NDI); a downlink assignment index; a transmission power control (TPC) command; a physical uplink control channel (PUCCH) resource indicator (PRI); a physical downlink shared channel (PDSCH) to HARQ feedback timing indicator; a sounding reference signal (SRS) request; code block group transmission information (CBGTI); or code block group flushing out information (CBGFI). For instance, referring to FIGS. 9 and 10C, the third DCI part 914, 1052 may include any of the following parameters: a HARQ process number 1054, a RVID 1056, a NDI 1058, a DAI 1060, a TPC command 1062, a PRI 1064, a PDSCH-to-HARQ feedback timing indicator 1066, a SRS request 1068, a CBGTI 1070, and a CBGFI 1072. The parameters may be different for each of the PDSCH transmissions 908.

In one example, the plurality of downlink data transmissions may comprise N transmissions, where the second portion of the downlink control information indicating an initial one of the N transmissions is multiplexed with the first portion of the downlink control information in the downlink control channel. For example, as illustrated in FIG. 9, the multi-stage downlink grant may schedule multiple PDSCH transmissions 908, in this case five (PDSCH 1, 2, 3, 4, 5, or N=5), although in other examples a different number N of PDSCH transmissions may be scheduled. In such example, the second DCI part 910 scheduling the initial PDSCH transmission (PDSCH 1) may be multiplexed with the first DCI part 902 in PDCCH 904.

In one example, the plurality of downlink data transmissions may comprise N transmissions, where the second portion of the downlink control information indicating an $n^{th}$ one of the N transmissions and the third portion of the downlink control information indicating an $(n-1)^{th}$ one of the N transmissions are multiplexed in allocated resources for the $(n-1)^{th}$ one of the N transmissions, where $1<n \leq N$. For example, as illustrated in FIG. 9, the multi-stage downlink grant may schedule multiple PDSCH transmissions 908, in this case five (PDSCH 1, 2, 3, 4, 5, or N=5), although in other examples a different number N of PDSCH transmissions may be scheduled. In such example, the second DCI part scheduling a subsequent (e.g., $n^{th}$) one of the PDSCH transmissions, and the third DCI part scheduling a current (e.g., $(n-1)^{th}$) one of the PDSCH transmissions, may be multiplexed together in the assigned time and frequency resources for the current (e.g., $(n-1)^{th}$) one of the five PDSCH transmissions. For instance, the second DCI part 910 scheduling PDSCH 5 and the third DCI part 914 scheduling PDSCH 4 may both be within the slot carrying PDSCH 4, the second DCI part scheduling PDSCH 4 and the third DCI part scheduling PDSCH 3 may both be within the slot carrying PDSCH 3, the second DCI part scheduling PDSCH 3 and the third DCI part scheduling PDSCH 2 may both be within the slot carrying PDSCH 2, and the second DCI part scheduling PDSCH 2 and the third DCI part scheduling PDSCH 1 may both be within the slot carrying PDSCH 1.

Figure 13:
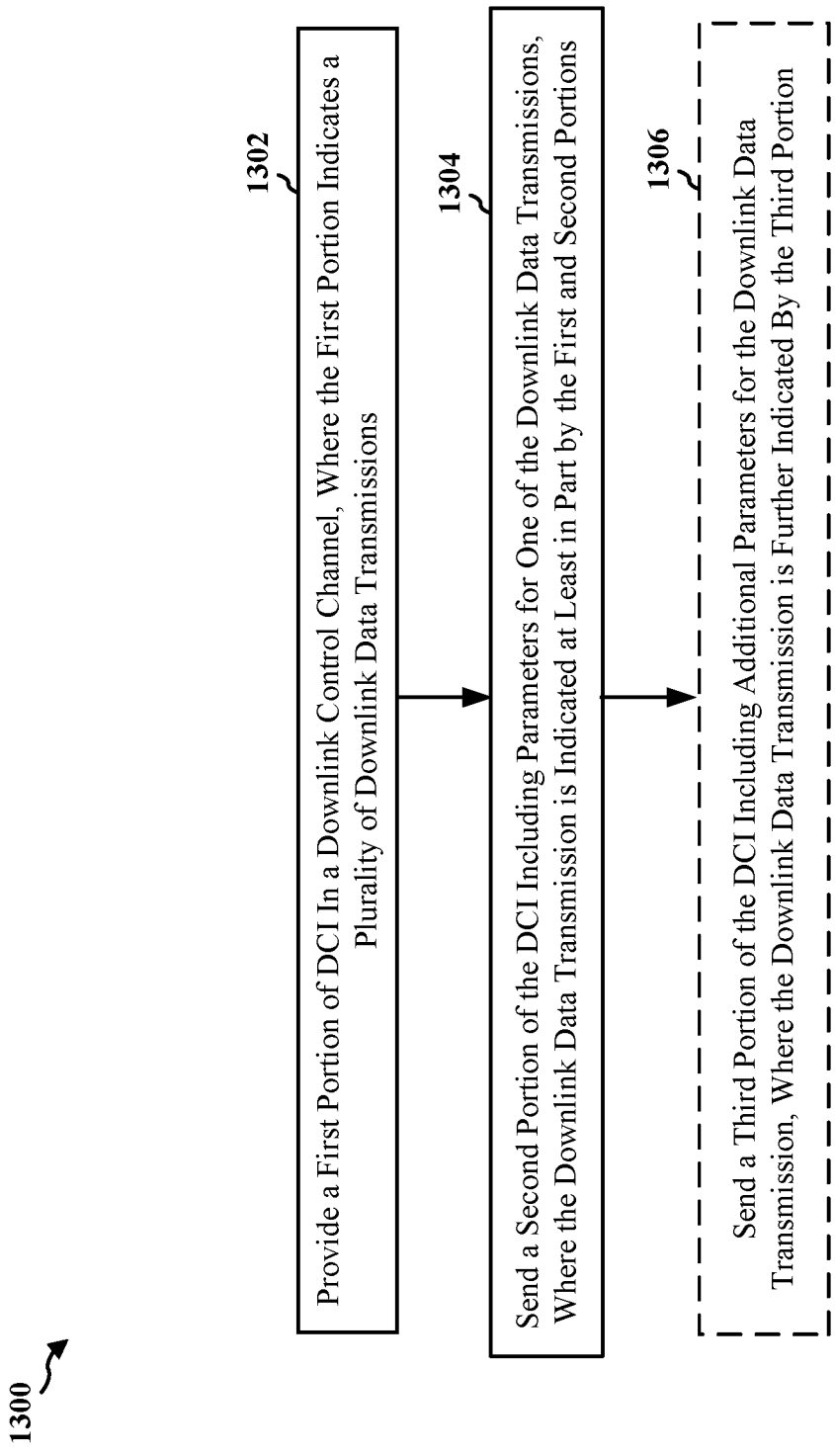
FIG. 13 is a flowchart of a method of wireless communication.

FIG. 13 is a flowchart 1300 of a method of wireless communication. The method may be performed by a base station (e.g., the base station 102/180, 310, 1104; the apparatus 1502.) Optional aspects are illustrated in dashed lines. The method allows a base station to provide downlink data to a UE in a multi-stage, multi-PDSCH grant with more scheduling flexibility than single-stage multi-PDSCH grants.

At 1302, the base station provides a first portion of downlink control information in a downlink control channel, where the first portion of downlink control information indicates a plurality of downlink data transmissions. For example, 1302 may be performed by PDCCH component 1540 of FIG. 15. For instance, as described above with respect to FIG. 11, at 1106, the base station 1104 may provide a first DCI part 1108 in PDCCH (e.g., PDCCH 504, 704, 904) to UE 1102. The first DCI part may indicate multiple PDSCH transmissions 508, 708, 908. For example, the first DCI part may include scheduling information 506, 706, 906 for the PDSCH transmissions 508, 708, 908, such as a total number of the scheduled PDSCH transmissions, carrier indicator, BWP, TDRA, FDRA, MCS, etc.

At 1304, the base station sends a second portion of the downlink control information including parameters for one of the downlink data transmissions. For example, 1304 may be performed by DCI portion transmission component 1542 of FIG. 15. For instance, as described above with respect to FIG. 11, in addition to providing first DCI part 1108 to UE 1102, the base station 1104 may send to the UE a second DCI part 1112 (e.g., second DCI part 510, 642, 710, 842, 910, 1022) scheduling one of the PDSCH transmissions (e.g., PDSCH transmissions 508, 708, 908). The one of the downlink data transmissions is indicated at least in part by the first portion of the downlink control information and the second portion of the downlink control information. For example, referring to FIGS. 5-11, the first DCI part 502, 602, 702, 1108 may include scheduling information 506, 706, 906 (e.g., FDRA, TDRA, MCS) for a corresponding PDSCH transmission, and the second DCI part 510, 642, 710, 842, 910, 1022, 1112 may include scheduling information 512, 712, 912 (e.g., HARQ process number, RVID, NDI, etc.) for that same PDSCH transmission. Thus, the downlink data in the PDSCH transmission 508, 708, 908 may be scheduled in combination by the first and second DCI parts.

In one example, the first portion of the downlink control information may indicate allocated resources for the one of the downlink data transmissions, and the second portion of the downlink control information may be multiplexed with the one of the downlink data transmissions in the allocated resources. For instance, referring to FIGS. 5 and 6A, the first DCI part 502, 602 may indicate assigned frequency and time resources (e.g., FDRA 608 and TDRA 610) for any of the PDSCH transmissions 508, and the second DCI part 510, 610 may be multiplexed in the frequency and time resources of the PDSCH transmission 508 that the second DCI part is scheduling. For example, as illustrated in FIG. 5, the second DCI part 510 scheduling a PDSCH transmission may be contained within the same slot as that PDSCH transmission.

In one example, the second portion of the downlink control information may be transmitted in a slot prior to the one of the downlink data transmissions. For instance, referring to FIG. 7, the second DCI part 710 may be transmitted in a slot prior to the PDSCH transmission 708 being scheduled. For example, as illustrated in FIG. 7, each PDSCH transmission 708 may include downlink data occupying a respective slot, and each second DCI part 710 scheduling a corresponding PDSCH transmission may be multiplexed with the downlink data in a prior slot.

In one example, the plurality of downlink data transmissions may comprise N transmissions, where the second portion of the downlink control information indicating an initial one of the N transmissions is multiplexed with the first portion of the downlink control information in the downlink control channel, and the second portion of the downlink control information indicating an $n^{th}$ one of the N transmissions is multiplexed in allocated resources for an $(n-1)^{th}$ one of the N transmissions, where $1<n \leq N$. For example, as illustrated in FIG. 7, the multi-stage downlink grant may schedule multiple PDSCH transmissions 708, in this case five (PDSCH 1, 2, 3, 4, 5, or N=5), although in other examples a different number N of PDSCH transmissions may be scheduled. In such example, the second DCI part 710 scheduling the initial PDSCH transmission (PDSCH 1) may be multiplexed with the first DCI part 702 in PDCCH 704, and the second DCI part scheduling a current (e.g., $n^{th}$) one of the remaining PDSCH transmissions may be multiplexed in the assigned time and frequency resources for a previous (e.g., $(n-1)^{th}$) one of the five PDSCH transmissions. For instance, the second DCI part 710 scheduling PDSCH 5 may be within the slot carrying PDSCH 4, the second DCI part scheduling PDSCH 4 may be within the slot carrying PDSCH 3, the second DCI part scheduling PDSCH 3 may be within the slot carrying PDSCH 2, and the second DCI part scheduling PDSCH 2 may be within the slot carrying PDSCH 1.

At 1306, the base station may send a third portion of the downlink control information including additional parameters for the one of the downlink data transmissions, where the one of the downlink data transmissions is further indicated by the third portion of the downlink control information. For example, 1306 may also be performed by DCI portion transmission component 1542 of FIG. 15. For instance, referring to FIG. 11, after sending the second DCI part 1112 (e.g., including FDRA, TDRA, MCS, etc.), the base station 1104 may also send third DCI part 1118 (e.g., third DCI part 914, 1052) scheduling one of the PDSCH transmissions (e.g., PDSCH transmissions 908) to UE 1102. The third DCI part may include scheduling information 916 for a corresponding one of the PDSCH transmissions in addition to the second DCI part, such as HARQ process number, RVID, NDI, DAI, PRI, K1, etc. Thus, the downlink data in the PDSCH transmission may be scheduled in combination by the first, second, and third DCI parts.

In one example, the second portion of the downlink control information may indicate allocated resources for the one of the downlink data transmissions, and the third portion of the downlink control information may be multiplexed with the one of the downlink data transmissions in the allocated resources. For instance, referring to FIGS. 9, 10B and 10C, the second DCI part 910, 1022 may indicate assigned frequency and time resources (e.g., FDRA 1024 and TDRA 1026) for any of the PDSCH transmissions 908, and the third DCI part 914, 1052 may be multiplexed in the frequency and time resources of the PDSCH transmission 908 that the third DCI part is scheduling. For example, as illustrated in FIG. 9, the third DCI part 914 scheduling a PDSCH transmission may be contained within the same slot as that PDSCH transmission.

In one example, the plurality of downlink data transmissions may comprise N transmissions, where the second portion of the downlink control information indicating an initial one of the N transmissions is multiplexed with the first portion of the downlink control information in the downlink control channel. For example, as illustrated in FIG. 9, the multi-stage downlink grant may schedule multiple PDSCH transmissions 908, in this case five (PDSCH 1, 2, 3, 4, 5, or N=5), although in other examples a different number N of PDSCH transmissions may be scheduled. In such example, the second DCI part 910 scheduling the initial PDSCH transmission (PDSCH 1) may be multiplexed with the first DCI part 902 in PDCCH 904.

In one example, the plurality of downlink data transmissions may comprise N transmissions, where the second portion of the downlink control information indicating an $n^{th}$ one of the N transmissions and the third portion of the downlink control information indicating an $(n-1)^{th}$ one of the N transmissions are multiplexed in allocated resources for the $(n-1)^{th}$ one of the N transmissions, where $1<n \leq N$. For example, as illustrated in FIG. 9, the multi-stage downlink grant may schedule multiple PDSCH transmissions 908, in this case five (PDSCH 1, 2, 3, 4, 5, or N=5), although in other examples a different number N of PDSCH transmissions may be scheduled. In such example, the second DCI part scheduling a subsequent (e.g., $n^{th}$) one of the PDSCH transmissions, and the third DCI part scheduling a current (e.g., $(n-1)^{th}$) one of the PDSCH transmissions, may be multiplexed together in the assigned time and frequency resources for the current (e.g., $(n-1)^{th}$) one of the five PDSCH transmissions. For instance, the second DCI part 910 scheduling PDSCH 5 and the third DCI part 914 scheduling PDSCH 4 may both be within the slot carrying PDSCH 4, the second DCI part scheduling PDSCH 4 and the third DCI part scheduling PDSCH 3 may both be within the slot carrying PDSCH 3, the second DCI part scheduling PDSCH 3 and the third DCI part scheduling PDSCH 2 may both be within the slot carrying PDSCH 2, and the second DCI part scheduling PDSCH 2 and the third DCI part scheduling PDSCH 1 may both be within the slot carrying PDSCH 1.

Figure 14:
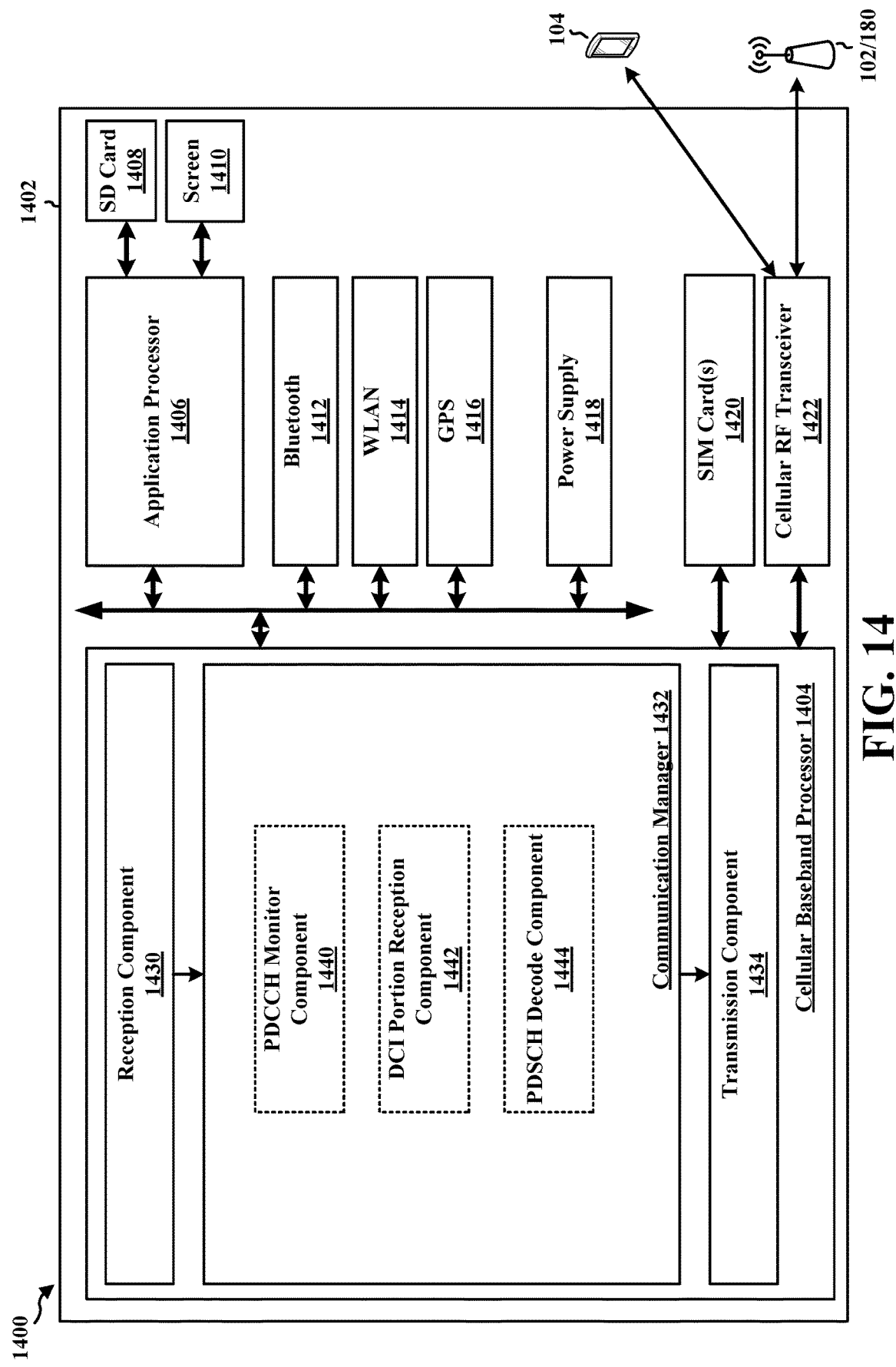
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the afore discussed additional modules of the apparatus 1402.

The communication manager 1432 includes a PDCCH monitor component 1440 that is configured to monitor a downlink control channel for a first portion of downlink control information, where the first portion of downlink control information indicates a plurality of downlink data transmissions, e.g., as described in connection with 1110 and 1202. The communication manager 1432 further includes a DCI portion reception component 1442 that is configured to obtain a second portion of the downlink control information including parameters for one of the downlink data transmissions, e.g., as described in connection with 1204. The DCI portion reception component 1442 is also configured to obtain a third portion of the downlink control information including additional parameters for the one of the downlink data transmissions, e.g., as described in connection with 1208. The communication manager 1432 further includes a PDSCH decode component 1444 that receives input in the form of the first portion of the downlink control information from PDCCH monitor component 1440 and the second portion of the downlink control information from DCI portion reception component 1442 and is configured to decode the one of the downlink data transmissions indicated at least in part by the first portion of the downlink control information and the second portion of the downlink control information, e.g., as described in connection with 1114 and 1206. The PDSCH decode component 1444 may also receive input in the form of the third portion from the DCI portion reception component 1442 and is further configured to decode the one of the downlink data transmissions further indicated by the third portion of the downlink control information, e.g., as described in connection with 1114, 1120, 1206, and 1208.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for monitoring a downlink control channel for a first portion of downlink control information, wherein the first portion of downlink control information indicates a plurality of downlink data transmissions; means for obtaining a second portion of the downlink control information including parameters for one of the downlink data transmissions; and means for decoding the one of the downlink data transmissions indicated at least in part by the first portion of the downlink control information and the second portion of the downlink control information.

In one configuration, the means for obtaining may be further configured to obtain a third portion of the downlink control information including additional parameters for the one of the downlink data transmissions, wherein the decoded one of the downlink data transmissions is further indicated by the third portion of the downlink control information.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
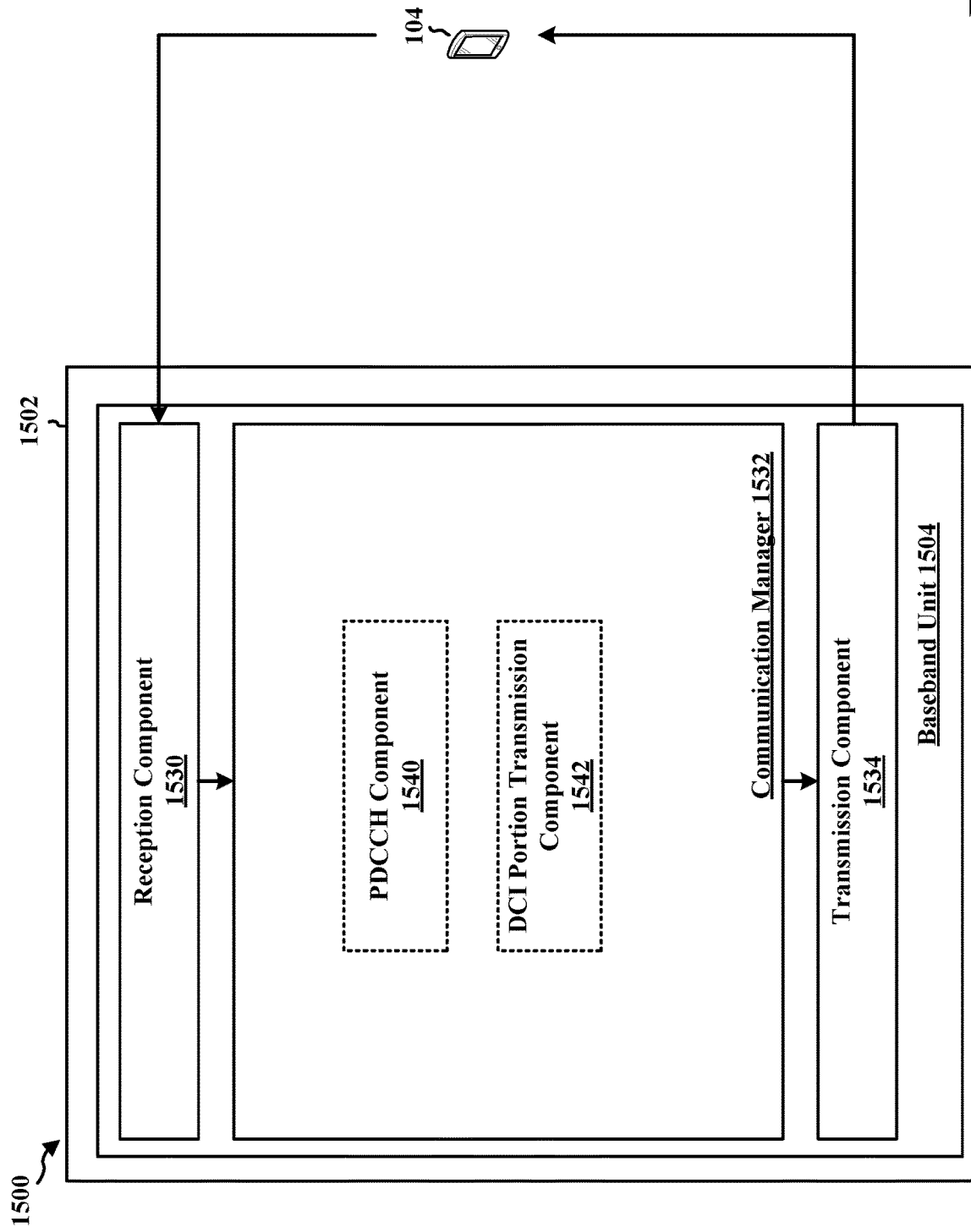
FIG. 15 is a diagram illustrating another example of a hardware implementation for another example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a PDCCH component 1540 that is configured to provide a first portion of downlink control information in a downlink control channel, where the first portion of downlink control information indicates a plurality of downlink data transmissions, e.g., as described in connection with 1106 and 1302. The communication manager 1532 further includes a DCI portion transmission component 1542 that is configured to send a second portion of the downlink control information including parameters for one of the downlink data transmissions, where the one of the downlink data transmissions is indicated at least in part by the first portion of the downlink control information and the second portion of the downlink control information, e.g., as described in connection with 1304. The DCI portion transmission component 1542 may be further configured to send a third portion of the downlink control information including additional parameters for the one of the downlink data transmissions, where the one of the downlink data transmissions is further indicated by the third portion of the downlink control information, e.g., as described in connection with 1306.

The apparatus may include additional components that perform each of the blocks of the algorithm in the aforementioned flowcharts of FIGS. 11 and 13. As such, each block in the aforementioned flowcharts of FIGS. 11 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for providing a first portion of downlink control information in a downlink control channel, wherein the first portion of downlink control information indicates a plurality of downlink data transmissions; and means for sending a second portion of the downlink control information including parameters for one of the downlink data transmissions; wherein the one of the downlink data transmissions is indicated at least in part by the first portion of the downlink control information and the second portion of the downlink control information.

In one configuration, the means for sending may be further configured to send a third portion of the downlink control information including additional parameters for the one of the downlink data transmissions, wherein the one of the downlink data transmissions is further indicated by the third portion of the downlink control information.

The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

While single-stage multi-PDSCH grants may provide downlink control overhead savings over single-PDSCH grants, single-stage multi-PDSCH grants still lack a degree of scheduling flexibility. For example, the base station may be constrained to make all of its scheduling decisions prior to transmitting the downlink grant scheduling the downlink data burst. The multi-stage multi-PDSCH grant of the present disclosure provides more flexibility in scheduling multiple PDSCH transmissions than single-stage multi-PDSCH grants by allowing the base station to split DCI into multiple parts which may be configured and transmitted at different times during the downlink data burst. Thus, the base station may flexibly make scheduling decisions during its downlink data burst in contrast to single-stage multi-PDSCH grants. The base station may achieve this scheduling flexibility according to various options. For example, in the first option described above, the base station may flexibly piggyback incremental information such as HARQ process numbers, RVIDs, and NDIs in each PDSCH transmission being scheduled (e.g., in the second DCI part), thus allowing the base station to make last minute scheduling decisions (e.g., retransmissions) based on HARQ feedback from the UE during the downlink data burst. Moreover, in the second option described above, the base station's scheduling decisions for a PDSCH transmission may be performed in advance by at least one prior slot, thereby reducing the impact of PDSCH decoding delay from second DCI parts and allowing the base station to dynamically change time-critical information such as TCI during the downlink burst. Additionally, in the third option described above, the base station may combine the approaches of the first and second options by flexibly piggybacking incremental information such as HARQ process numbers, RVIDs, and NDIs in each PDSCH transmission being scheduled (e.g., in the third DCI part) as well as flexibly changing time-critical information such as TCI during the downlink burst (e.g., in the second DCI part). Thus, the third option may provide more scheduling flexibility than the first and second options.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: monitoring a downlink control channel for a first portion of downlink control information, wherein the first portion of downlink control information indicates a plurality of downlink data transmissions; obtaining a second portion of the downlink control information including parameters for one of the downlink data transmissions; and decoding the one of the downlink data transmissions indicated at least in part by the first portion of the downlink control information and the second portion of the downlink control information.

Example 2 is the method of Example 1, wherein the first portion of the downlink control information indicates allocated resources for the one of the downlink data transmissions, and the second portion of the downlink control information is multiplexed with the one of the downlink data transmissions in the allocated resources.

Example 3 is the method of Example 2, wherein the first portion of the downlink control information includes common parameters for the plurality of downlink data transmissions, the common parameters including one or more of: a carrier indicator; a bandwidth part indicator; a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); a transmission power control (TPC) command; an antenna port; a transmission configuration indication (TCI); a sounding reference signal (SRS) request; or a demodulation reference signal (DMRS) sequence initialization.

Example 4 is the method of any of Examples 2 and 3, wherein the parameters of the second portion of the downlink control information include one or more of: a hybrid automatic repeat request (HARQ) process number; a redundancy version (RVID); a new data indicator (NDI); a downlink assignment index; a transmission power control (TPC) command; a physical uplink control channel (PUCCH) resource indicator (PM); a physical downlink shared channel (PDSCH) to HARQ feedback timing indicator; code block group transmission information (CBGTI); or code block group flushing out information (CBGFI).

Example 5 is the method of Example 1, wherein the second portion of the downlink control information is received in a slot prior to the one of the downlink data transmissions.

Example 6 is the method of Example 5, wherein the first portion of the downlink control information includes common parameters for the plurality of downlink data transmissions, the common parameters including one or more of: a carrier indicator; a bandwidth part indicator; a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); a transmission power control (TPC) command; an antenna port; a sounding reference signal (SRS) request; or a demodulation reference signal (DMRS) sequence initialization.

Example 7 is the method of any of Examples 5 and 6, wherein the parameters of the second portion of the downlink control information include one or more of: a hybrid automatic repeat request (HARQ) process number; a redundancy version (RVID); a new data indicator (NDI); a downlink assignment index; a physical uplink control channel (PUCCH) resource indicator (PM); a physical downlink shared channel (PDSCH) to HARQ feedback timing indicator; a transmission configuration indication (TCI); code block group transmission information (CBGTI); or code block group flushing out information (CBGFI).

Example 8 is the method of any of Examples 5 to 7, wherein the plurality of downlink data transmissions comprise N transmissions, the second portion of the downlink control information indicating an initial one of the N transmissions is multiplexed with the first portion of the downlink control information in the downlink control channel, and the second portion of the downlink control information indicating an $n^{th}$ one of the N transmissions is multiplexed in allocated resources for an $(n-1)^{th}$ one of the N transmissions, wherein $1<n \leq N$.

Example 9 is the method of Example 1, further comprising: obtaining a third portion of the downlink control information including additional parameters for the one of the downlink data transmissions, wherein the decoded one of the downlink data transmissions is further indicated by the third portion of the downlink control information.

Example 10 is the method of Example 9, wherein the second portion of the downlink control information indicates allocated resources for the one of the downlink data transmissions, and the third portion of the downlink control information is multiplexed with the one of the downlink data transmissions in the allocated resources.

Example 11 is the method of any of Examples 9 and 10, wherein the first portion of the downlink control information include common parameters for the plurality of downlink data transmissions, the common parameters including one or more of: a carrier indicator; or a bandwidth part indicator.

Example 12 is the method of any of Examples 9 to 11, wherein the parameters of the second portion of the downlink control information include one or more of: a frequency domain resource assignment (FDRA); a time domain resource assignment (TDRA); a virtual resource block (VRB) to physical resource block (PRB) mapping; a PRB bundling size indicator; a rate matching indicator; a zero power (ZP) channel state information (CSI) reference signal (ZP CSI-RS) trigger; a modulation and coding scheme (MCS); an antenna port; a transmission configuration indication (TCI); or a demodulation reference signal (DMRS) sequence initialization.

Example 13 is the method of any of Examples 9 to 12, wherein the additional parameters of the third portion of the downlink control information include one or more of: a hybrid automatic repeat request (HARQ) process number; a redundancy version (RVID); a new data indicator (NDI); a downlink assignment index; a transmission power control (TPC) command; a physical uplink control channel (PUCCH) resource indicator (PM); a physical downlink shared channel (PDSCH) to HARQ feedback timing indicator; a sounding reference signal (SRS) request; code block group transmission information (CBGTI); or code block group flushing out information (CBGFI).

Example 14 is the method of any of Examples 9 to 13, wherein the plurality of downlink data transmissions comprise N transmissions, and the second portion of the downlink control information indicating an initial one of the N transmissions is multiplexed with the first portion of the downlink control information in the downlink control channel; and wherein the second portion of the downlink control information indicating an $n^{th}$ one of the N transmissions and the third portion of the downlink control information indicating an $(n-1)^{th}$ one of the N transmissions are multiplexed in allocated resources for the $(n-1)^{th}$ one of the N transmissions, wherein $1<n\leq N$.

Example 15 is an apparatus for wireless communication, comprising: a processor; memory coupled with the processor; and instructions stored in the memory and operable, when executed by the processor, to cause the apparatus to: monitor a downlink control channel for a first portion of downlink control information, wherein the first portion of downlink control information indicates a plurality of downlink data transmissions; obtain a second portion of the downlink control information including parameters for one of the downlink data transmissions; and decode the one of the downlink data transmissions indicated at least in part by the first portion of the downlink control information and the second portion of the downlink control information.

Example 16 is the apparatus of Example 15, wherein the first portion of the downlink control information indicates allocated resources for the one of the downlink data transmissions, and the second portion of the downlink control information is multiplexed with the one of the downlink data transmissions in the allocated resources.

Example 17 is the apparatus of Example 15, wherein the second portion of the downlink control information is received in a slot prior to the one of the downlink data transmissions.

Example 18 is the apparatus of Example 15, wherein the instructions, when executed by the processor, further cause the apparatus to: obtain a third portion of the downlink control information including additional parameters for the one of the downlink data transmissions, wherein the decoded one of the downlink data transmissions is further indicated by the third portion of the downlink control information.

Example 19 is a method of wireless communication at a base station, comprising: providing a first portion of downlink control information in a downlink control channel, wherein the first portion of downlink control information indicates a plurality of downlink data transmissions; and sending a second portion of the downlink control information including parameters for one of the downlink data transmissions; wherein the one of the downlink data transmissions is indicated at least in part by the first portion of the downlink control information and the second portion of the downlink control information.

Example 20 is the method of Example 19, wherein the first portion of the downlink control information indicates allocated resources for the one of the downlink data transmissions, and the second portion of the downlink control information is multiplexed with the one of the downlink data transmissions in the allocated resources.

Example 21 is the method of Example 19, wherein the second portion of the downlink control information is transmitted in a slot prior to the one of the downlink data transmissions.

Example 22 is the method of Example 21, wherein the plurality of downlink data transmissions comprise N transmissions, the second portion of the downlink control information indicating an initial one of the N transmissions is multiplexed with the first portion of the downlink control information in the downlink control channel, and the second portion of the downlink control information indicating an $n^{th}$ one of the N transmissions is multiplexed in allocated resources for an $(n-1)^{th}$ one of the N transmissions, wherein $1<n\leq N$.

Example 23 is the method of Example 19, further comprising: sending a third portion of the downlink control information including additional parameters for the one of the downlink data transmissions, wherein the one of the downlink data transmissions is further indicated by the third portion of the downlink control information.

Example 24 is the method of Example 23, wherein the second portion of the downlink control information indicates allocated resources for the one of the downlink data transmissions, and the third portion of the downlink control information is multiplexed with the one of the downlink data transmissions in the allocated resources.

Example 25 is the method of any of Examples 23 and 24, wherein the plurality of downlink data transmissions comprise N transmissions, and the second portion of the downlink control information indicating an initial one of the N transmissions is multiplexed with the first portion of the downlink control information in the downlink control channel; and wherein the second portion of the downlink control information indicating an $n^{th}$ one of the N transmissions and the third portion of the downlink control information indicating an $(n-1)^{th}$ one of the N transmissions are multiplexed in allocated resources for the $(n-1)^{th}$ one of the N transmissions, wherein $1<n\leq N$.

Example 26 is an apparatus for wireless communication, comprising: a processor; memory coupled with the processor; and instructions stored in the memory and operable, when executed by the processor, to cause the apparatus to: provide a first portion of downlink control information in a downlink control channel, wherein the first portion of downlink control information indicates a plurality of downlink data transmissions; and send a second portion of the downlink control information including parameters for one of the downlink data transmissions; wherein the one of the downlink data transmissions is indicated at least in part by the first portion of the downlink control information and the second portion of the downlink control information.

Example 27 is the apparatus of Example 26, wherein the first portion of the downlink control information indicates allocated resources for the one of the downlink data transmissions, and the second portion of the downlink control information is multiplexed with the one of the downlink data transmissions in the allocated resources.

Example 28 is the apparatus of Example 26, wherein the second portion of the downlink control information is transmitted in a slot prior to the one of the downlink data transmissions.

Example 29 is the apparatus of Example 26, wherein the instructions, when executed by the processor, further cause the apparatus to: send a third portion of the downlink control information including additional parameters for the one of the downlink data transmissions, wherein the one of the downlink data transmissions is further indicated by the third portion of the downlink control information.

Example 30 is the apparatus of Example 29, wherein the second portion of the downlink control information indicates allocated resources for the one of the downlink data transmissions, and the third portion of the downlink control information is multiplexed with the one of the downlink data transmissions in the allocated resources.

What is claimed is:

1. A method of wireless communication at a user equipment (UE), comprising:
    monitoring a downlink control channel for a first portion of downlink control information, the first portion of the downlink control information indicating a plurality of downlink data transmissions, the plurality of downlink data transmissions comprising N transmissions, a second portion of the downlink control information indicating an initial one of the N transmissions being multiplexed with the first portion of the downlink control information in the downlink control channel, and the second portion of the downlink control information indicating an $n^{th}$ one of the N transmissions being multiplexed in allocated resources for an $(n-1)^{th}$ one of the N transmissions, wherein $1 < n \leq N$;
    obtaining the second portion of the downlink control information including parameters for one of the downlink data transmissions; and
    decoding the one of the downlink data transmissions indicated at least in part by the first portion of the downlink control information and the second portion of the downlink control information.

2. The method of claim 1, wherein the first portion of the downlink control information indicates the allocated resources for the one of the downlink data transmissions.

3. The method of claim 2, wherein the first portion of the downlink control information includes common parameters for the plurality of downlink data transmissions, the common parameters including one or more of:
    a carrier indicator;
    a bandwidth part indicator;
    a frequency domain resource assignment (FDRA);
    a time domain resource assignment (TDRA);
    a virtual resource block (VRB) to physical resource block (PRB) mapping;
    a PRB bundling size indicator;
    a rate matching indicator;
    a zero power (ZP) channel state information (CSI) reference signal (ZP CSI-RS) trigger;
    a modulation and coding scheme (MCS);
    a transmission power control (TPC) command;
    an antenna port;
    a transmission configuration indication (TCI);
    a sounding reference signal (SRS) request; or
    a demodulation reference signal (DMRS) sequence initialization.

4. The method of claim 2, wherein the parameters of the second portion of the downlink control information include one or more of:
    a hybrid automatic repeat request (HARQ) process number;
    a redundancy version (RVID);
    a new data indicator (NDI);
    a downlink assignment index;
    a transmission power control (TPC) command;
    a physical uplink control channel (PUCCH) resource indicator (PM);
    a physical downlink shared channel (PDSCH) to HARQ feedback timing indicator;
    code block group transmission information (CBGTI); or
    code block group flushing out information (CBGFI).

5. The method of claim 1, wherein the second portion of the downlink control information is received in a slot prior to the one of the downlink data transmissions.

6. The method of claim 5, wherein the first portion of the downlink control information includes common parameters for the plurality of downlink data transmissions, the common parameters including one or more of:
    a carrier indicator;
    a bandwidth part indicator;
    a frequency domain resource assignment (FDRA);
    a time domain resource assignment (TDRA);
    a virtual resource block (VRB) to physical resource block (PRB) mapping;
    a PRB bundling size indicator;
    a rate matching indicator;
    a zero power (ZP) channel state information (CSI) reference signal (ZP CSI-RS) trigger;
    a modulation and coding scheme (MCS);
    a transmission power control (TPC) command;
    an antenna port;
    a sounding reference signal (SRS) request; or
    a demodulation reference signal (DMRS) sequence initialization.

7. The method of claim 5, wherein the parameters of the second portion of the downlink control information include one or more of:
    a hybrid automatic repeat request (HARQ) process number;
    a redundancy version (RVID);
    a new data indicator (NDI);
    a downlink assignment index;
    a physical uplink control channel (PUCCH) resource indicator (PM);
    a physical downlink shared channel (PDSCH) to HARQ feedback timing indicator;
    a transmission configuration indication (TCI);
    code block group transmission information (CBGTI); or
    code block group flushing out information (CBGFI).

8. The method of claim 1, further comprising:
    obtaining a third portion of the downlink control information including additional parameters for the one of the downlink data transmissions, the decoded one of the downlink data transmissions further indicated by the third portion of the downlink control information.

9. The method of claim 8, wherein the second portion of the downlink control information indicates the allocated resources for the one of the downlink data transmissions, and the third portion of the downlink control information is multiplexed with the one of the downlink data transmissions in the allocated resources.

10. The method of claim 8, wherein the first portion of the downlink control information includes common parameters for the plurality of downlink data transmissions, the common parameters including one or more of:
  a carrier indicator; or
  a bandwidth part indicator.
11. The method of claim 8, wherein the parameters of the second portion of the downlink control information include one or more of:
  a frequency domain resource assignment (FDRA);
  a time domain resource assignment (TDRA);
  a virtual resource block (VRB) to physical resource block (PRB) mapping;
  a PRB bundling size indicator;
  a rate matching indicator;
  a zero power (ZP) channel state information (CSI) reference signal (ZP CSI-RS) trigger;
  a modulation and coding scheme (MCS);
  an antenna port;
  a transmission configuration indication (TCI); or
  a demodulation reference signal (DMRS) sequence initialization.
12. The method of claim 8, wherein the additional parameters of the third portion of the downlink control information include one or more of:
  a hybrid automatic repeat request (HARQ) process number;
  a redundancy version (RVID);
  a new data indicator (NDI);
  a downlink assignment index;
  a transmission power control (TPC) command;
  a physical uplink control channel (PUCCH) resource indicator (PM);
  a physical downlink shared channel (PDSCH) to HARQ feedback timing indicator;
  a sounding reference signal (SRS) request;
  code block group transmission information (CBGTI); or
  code block group flushing out information (CBGFI).
13. The method of claim 8,
  wherein the third portion of the downlink control information indicating the $(n-1)^t$ one of the N transmissions is further multiplexed in the allocated resources for the $(n-1)^{th}$ one of the N transmissions.
14. An apparatus for wireless communication, comprising:
  a processor;
  memory coupled with the processor; and
  instructions stored in the memory and operable, when executed by the processor, to cause the apparatus to:
    monitor a downlink control channel for a first portion of downlink control information, the first portion of the downlink control information indicating a plurality of downlink data transmissions, the plurality of downlink data transmissions comprising N transmissions, a second portion of the downlink control information indicating an initial one of the N transmissions being multiplexed with the first portion of the downlink control information in the downlink control channel, and the second portion of the downlink control information indicating an $n^{th}$ one of the N transmissions being multiplexed in allocated resources for an $(n-1)^{th}$ one of the N transmissions, wherein $1<n \leq N$;
    obtain the second portion of the downlink control information including parameters for one of the downlink data transmissions; and
    decode the one of the downlink data transmissions indicated at least in part by the first portion of the downlink control information and the second portion of the downlink control information.
15. The apparatus of claim 14, wherein the first portion of the downlink control information indicates the allocated resources for the one of the downlink data transmissions.
16. The apparatus of claim 14, wherein the second portion of the downlink control information is received in a slot prior to the one of the downlink data transmissions.
17. The apparatus of claim 14, wherein the instructions, when executed by the processor, further cause the apparatus to:
  obtain a third portion of the downlink control information including additional parameters for the one of the downlink data transmissions, wherein the decoded one of the downlink data transmissions is further indicated by the third portion of the downlink control information.
18. A method of wireless communication at a base station, comprising:
  providing a first portion of downlink control information in a downlink control channel, the first portion of the downlink control information indicating a plurality of downlink data transmissions, the plurality of downlink data transmissions comprising N transmissions, a second portion of the downlink control information indicating an initial one of the N transmissions being multiplexed with the first portion of the downlink control information in the downlink control channel, and the second portion of the downlink control information indicating an $n^{th}$ one of the N transmissions being multiplexed in allocated resources for an $(n-1)^{th}$ one of the N transmissions, wherein $1<n \leq N$; and
  sending the second portion of the downlink control information including parameters for one of the downlink data transmissions,
  the one of the downlink data transmissions being indicated at least in part by the first portion of the downlink control information and the second portion of the downlink control information.
19. The method of claim 18, wherein the first portion of the downlink control information indicates the allocated resources for the one of the downlink data transmissions.
20. The method of claim 18, wherein the second portion of the downlink control information is transmitted in a slot prior to the one of the downlink data transmissions.
21. The method of claim 18, further comprising:
  sending a third portion of the downlink control information including additional parameters for the one of the downlink data transmissions, the one of the downlink data transmissions being further indicated by the third portion of the downlink control information.
22. The method of claim 21, wherein the second portion of the downlink control information indicates the allocated resources for the one of the downlink data transmissions, and the third portion of the downlink control information is multiplexed with the one of the downlink data transmissions in the allocated resources.
23. The method of claim 21,
  wherein the third portion of the downlink control information indicating the $(n-1)^t$ one of the N transmissions is further multiplexed in the allocated resources for the $(n-1)^{th}$ one of the N transmissions.
24. An apparatus for wireless communication, comprising:

a processor;

memory coupled with the processor; and instructions stored in the memory and operable, when executed by the processor, to cause the apparatus to:

provide a first portion of downlink control information in a downlink control channel, the first portion of the downlink control information indicating a plurality of downlink data transmissions, the plurality of downlink data transmissions comprising N transmissions, a second portion of the downlink control information indicating an initial one of the N transmissions being multiplexed with the first portion of the downlink control information in the downlink control channel, and the second portion of the downlink control information indicating an $n^{th}$ one of the N transmissions being multiplexed in allocated resources for an $(n-1)^{t}$ one of the N transmissions, wherein $1<n\leq N$;

send the second portion of the downlink control information including parameters for one of the downlink data transmissions, the one of the downlink data transmissions being indicated at least in part by the first portion of the downlink control information and the second portion of the downlink control information.

25. The apparatus of claim 24, wherein the first portion of the downlink control information indicates the allocated resources for the one of the downlink data transmissions.

26. The apparatus of claim 24, wherein the second portion of the downlink control information is transmitted in a slot prior to the one of the downlink data transmissions.

27. The apparatus of claim 24, wherein the instructions, when executed by the processor, further cause the apparatus to:

send a third portion of the downlink control information including additional parameters for the one of the downlink data transmissions, the one of the downlink data transmissions being further indicated by the third portion of the downlink control information.

28. The apparatus of claim 27, wherein the second portion of the downlink control information indicates the allocated resources for the one of the downlink data transmissions, and the third portion of the downlink control information is multiplexed with the one of the downlink data transmissions in the allocated resources.

* * * * *